United States Patent
Park et al.

(10) Patent No.: US 9,936,334 B2
(45) Date of Patent: Apr. 3, 2018

(54) ELECTRONIC DEVICE AND OPERATION METHOD THEREOF

(71) Applicant: Samsung Electronics Co., Ltd, Gyeonggi-do (KR)

(72) Inventors: Joonwon Park, Gyeonggi-do (KR); Jaeho Ko, Seoul (KR); Hyunjung Kwon, Seoul (KR); Hyeeun Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/283,261

(22) Filed: Sep. 30, 2016

(65) Prior Publication Data

US 2017/0094442 A1  Mar. 30, 2017

(30) Foreign Application Priority Data

Sep. 30, 2015 (KR) .................. 10-2015-0137537

(51) Int. Cl.
| | | |
|---|---|---|
| H04W 4/00 | (2009.01) |
| G06F 3/0482 | (2013.01) |
| H04L 29/08 | (2006.01) |
| H04M 1/725 | (2006.01) |
| H04W 4/20 | (2018.01) |

(52) U.S. Cl.
CPC .......... *H04W 4/003* (2013.01); *G06F 3/0482* (2013.01); *H04L 67/10* (2013.01); *H04M 1/72525* (2013.01); *H04W 4/20* (2013.01)

(58) Field of Classification Search
CPC ....... H04W 4/003; H04W 4/20; H04W 4/206; H04W 4/00; G06F 3/0482; G06F 3/01; G06F 19/3406; G06F 3/04842; H04L 67/10; H04L 67/2823; H04L 29/08; H04M 1/72525; H04M 1/725; G06Q 30/02; G06Q 30/016; G09B 5/00; A63F 13/00; A63F 13/61

USPC .............. 455/466, 41.2; 709/224, 217, 218; 386/250, 241, 343

See application file for complete search history.

(56) References Cited

U.S. PATENT DOCUMENTS

| | | | |
|---|---|---|---|
| 7,941,819 B2* | 5/2011 | Stark ................. | G06F 17/30861 348/563 |
| 8,359,351 B2* | 1/2013 | Istvan ................ | H04N 5/44543 709/203 |
| 8,365,235 B2 | 1/2013 | Hunt et al. | |

(Continued)

FOREIGN PATENT DOCUMENTS

| | | | |
|---|---|---|---|
| GB | 2514393 A | * 11/2014 | ......... B64D 11/0014 |
| JP | 2005189761 A | * 7/2005 | ............. G06F 21/10 |

(Continued)

*Primary Examiner* — Mahendra Patel

(57) ABSTRACT

Disclosed are a method and an apparatus for providing a content. An electronic device includes a wireless communication module; a display; a memory; and a processor functionally connected to the wireless communication module, the display, and the memory, wherein the processor displays a guide interface for a content, determines a download or execution of the content based on a user input made using the guide interface, receives a demo content from an external device and displays the demo content in response to the execution of the content, and downloads the content from the external device in response to the download of the content. Various embodiments are possible.

18 Claims, 13 Drawing Sheets

(56) References Cited

U.S. PATENT DOCUMENTS

| | | | |
|---|---|---|---|
| 9,081,421 B1 * | 7/2015 | Lai | G06F 3/017 |
| 2006/0165384 A1 * | 7/2006 | Park | G11B 27/105 |
| | | | 386/336 |
| 2007/0010286 A1 * | 1/2007 | Luke | H04M 1/0208 |
| | | | 455/556.1 |
| 2007/0060135 A1 * | 3/2007 | Lin | H04L 12/66 |
| | | | 455/445 |
| 2008/0077620 A1 * | 3/2008 | Gilley | G06F 19/3406 |
| 2008/0078831 A1 * | 4/2008 | Johnson | G06Q 20/10 |
| | | | 235/380 |
| 2008/0104112 A1 * | 5/2008 | Nicholl | G06F 17/30749 |
| 2009/0158326 A1 * | 6/2009 | Hunt | G06F 3/04817 |
| | | | 725/38 |
| 2009/0249206 A1 * | 10/2009 | Stahlberg | G11B 27/34 |
| | | | 715/716 |
| 2011/0150426 A1 * | 6/2011 | Shintani | H04N 5/44543 |
| | | | 386/250 |
| 2012/0322042 A1 * | 12/2012 | Subhanjan | G06Q 30/02 |
| | | | 434/308 |
| 2015/0082239 A1 * | 3/2015 | Zhao | H04L 67/2823 |
| | | | 715/788 |
| 2015/0310488 A1 * | 10/2015 | Hess | G06Q 30/0257 |
| | | | 705/14.55 |

FOREIGN PATENT DOCUMENTS

| | | | | |
|---|---|---|---|---|
| JP | 2008152279 A | * | 7/2008 | |
| WO | WO 2011083498 A4 | * | 9/2011 | G06Q 30/02 |

\* cited by examiner

ELECTRONIC DEVICE AND OPERATION METHOD THEREOF

CROSS-REFERENCE TO RELATED APPLICATION(S) AND CLAIM OF PRIORITY

The present application is related to and claims priority under 35 U.S.C. § 119(a) to Korean Application Serial No. 10-2015-0137537, which was filed in the Korean Intellectual Property Office on Sep. 30, 2015, the entire content of which is hereby incorporated by reference.

TECHNICAL FIELD

The present disclosure relates to an electronic device configured to provide a content based on User Experience (UX) and an operation method thereof.

BACKGROUND

In recent years, with the development of wireless technologies, wired networks used by many people have been replaced with wireless networks. That is, since mobility problems with wired networks were solved using wireless technology, studies on a variety of technologies using wireless networks have been increasingly conducted. An electronic device may access an external server (for example, a content server, a store server, a market server, or the like) through a wireless network and download various contents (for example, games, applications, dynamic images, and the like).

An electronic device may install (or store) the downloaded content in the electronic device and output the content through a display according to a user input. According to an embodiment, users may search for (discover) a content of interest (for example, a new game) within the external server, download the found content from the external device, and then install and use (for example, play) the content. Accordingly, in order to use the content, the user should search for the content of interest and install the content in the electronic device.

However, rankings of the contents (for example, game rankings) provided from the external server do not frequently change, thus it is not easy to search for (discover) the content of interest of the user (for example, new game). Further, even though the user searches for the content of interest, information on the content of interest is very limited. Accordingly, the user has difficulty in determining whether the found content of interest is actually the same as the content which the user desires to use. For example, the external server provides only fragmentary information such as user reviews, screen shots, and relevant images of the content. As a result, the user has difficulty in determining (deciding) whether the corresponding content is the content which the user actually wants based on the information alone.

SUMMARY

The user may determine (decide) whether to use the corresponding content only after passing through the steps of content search (discovery)->download and install->play->execution within electronic device in order to identify the content. Accordingly, after executing the content installed in the electronic device, the user may determine whether the corresponding content is the content which the user desires or not according to user experience. In this case, the user should perform complex verification processes such as deleting (removing) the corresponding content from the electronic device and making a decision after experiencing other content through repetition of the above process. This corresponds to a very cumbersome process the user needs to complete to install various or a plurality of contents in the electronic device and may inconvenience the user. Further, due to repetition of installing and deleting content from the electronic device, when various contents (for example, the operating system, games, and applications) installed in the electronic device are used, an operation thereof may become slow.

To address the above-discussed deficiencies, it is a primary object to provide an electronic device configured to recommend a content that is suitable for a user based on content use history of the user, and a method of operating the same.

Various embodiments of the present disclosure may provide an electronic device configured to selectively download and install the recommended content through User Experience (UX), and a method of operating the same.

Various embodiments of the present disclosure may provide an electronic device configured to allow the user to experience in advance a content, which has not been installed in the electronic device, through the electronic device based on a cloud, and a method of operating the same.

Various embodiments of the present disclosure may provide an electronic device configured to, in response to a content, which has not been installed in the electronic device, being experienced based on the cloud, support a download of the corresponding content and a rapid search for another content of the same category, and a method of operating the same.

An electronic device according to various embodiments of the present disclosure includes: a wireless communication module; a display; a memory; and a processor functionally connected to the wireless communication module, the display, and the memory, wherein the processor displays a guide interface for a content, determines a download or execution of the content based on a user input made using the guide interface, receives a demo content from an external device and displays the demo content in response to the execution of the content, and downloads the content from the external device in response to the download of the content.

An electronic device according to various embodiments of the present disclosure includes: a wireless communication module; a memory; and a processor functionally connected to the wireless communication module and the memory, wherein the processor streams a demo content to an external device in response to a request for the demo content of the external device, detects whether to stop the demo content during the streaming of the demo content, stops the streaming of the demo content when it is determined to stop the use of the demo content, and process a content download, content navigation, or content like registration according to a content request when the content request is detected after the streaming of the demo content is stopped.

An method of operating an electronic device, or, stated differently, a method performed by an electronic device, according to various embodiments of the present disclosure includes: displaying a guide interface for a content; detecting a user input based on the guide interface; determining a download or an execution of the content based on the user input; receiving a demo content from an external device and displaying the demo content in response to the execution of the content; and downloading the content from the external device in response to the download of the content.

An method of operating an electronic device, or, stated differently, a method performed by an electronic device, according to various embodiments of the present disclosure includes: streaming a demo content to an external device in response to a request for the demo content of the external device; detecting whether to stop the use of the demo content during the streaming of the demo content; when it is determined to stop the use of the demo content, stopping the streaming of the demo content; and when a content request is detected after the streaming of the demo content is stopped, processing a content download, content navigation, or content like registration according to the content request.

In order to solve the technical problem, various embodiments of the present disclosure may include a computer-readable recording medium having a program recorded therein to perform the method by a processor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
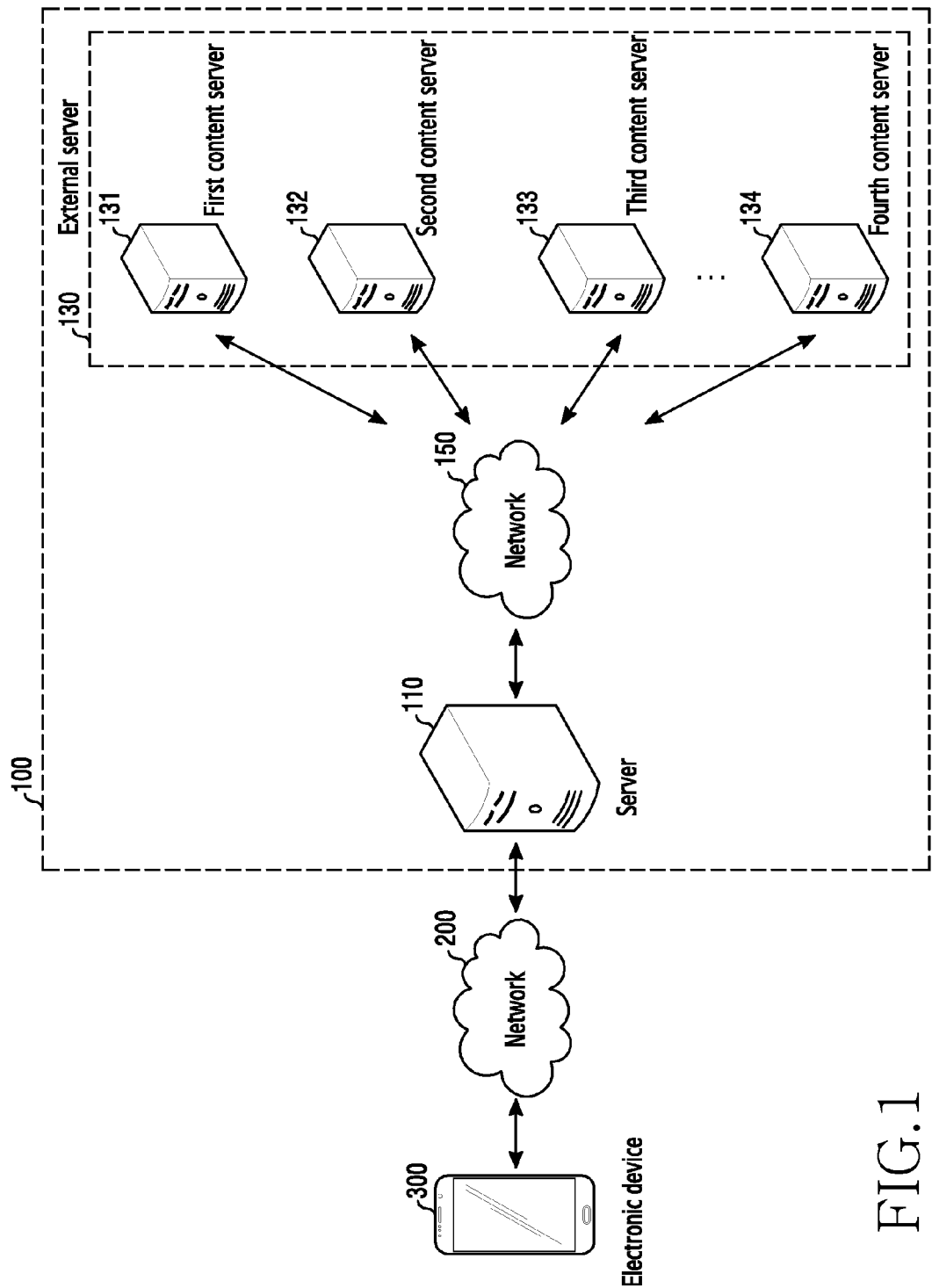
FIG. 1 schematically illustrates a configuration of a system for providing a content according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Proposed various embodiments of the present disclosure relate to an electronic device for selectively downloading a content based on User Experience (UX) and supporting an installation thereof, and an operation method thereof. Various embodiments of the present disclosure provide an electronic device and a method for providing a cloud-based content through a link between the electronic device and an external server (for example, a content server, a cloud server, a store server, or a market server) and determining whether to actually install the content after pre-experiencing the cloud-based content based on the UX.

Various embodiments of the present disclosure may include various contents which can be downloaded or installed in an electronic device and then used such as a game, an application, and a dynamic image. According to various embodiments, the external device may provide the content to the electronic device in a streaming type and, in the following description, the content may be used as the term including various types of data which can be downloaded or installed in the electronic device and then used such as a game, an application, and a dynamic image.

According to an embodiment of the present disclosure, the electronic device may include one or more communication interfaces (for example, a mobile communication module and a WLAN module) which can communicate with the external device through a wireless network. According to various embodiments, the electronic device may include a variety of devices that support functions (for example, UX-based content providing functions) according to various embodiments of the present disclosure and may include all devices that use one or more of a variety of processors, for example, an Application Processor (AP), a Communication Processor (CP), a Graphic Processing Unit (GPU), and a Central Processing Unit (CPU).

For example, the electronic device may include at least one of a smartphone, a tablet personal computer (PC), a mobile phone, a video phone, an electronic book (e-book) reader, a personal digital assistant (PDA), a portable multimedia player (PMP), an MP3 player, a camera, and a wearable device (e.g., a head-mounted-device (HMD) such as electronic glasses, electronic clothes, an electronic bracelet, an electronic necklace, an electronic appcessory, electronic tattoos, or a smart watch).

Further, in embodiments of the present disclosure, the electronic device may include a smart home appliance. The home appliance may include at least one of, for example, a television, a Digital Video Disk (DVD) player, a TV box (e.g., Samsung HomeSync™, Apple TV™, or Google TV™), a game console (e.g., Xbox™ and PlayStation™), a camcorder, and an electronic photo frame. Further, in embodiments of the present disclosure, the electronic device may include at least one of a navigation device, a car infotainment device, and an Internet of things (IoT) device.

The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

The term "user" as used in various embodiments of the present disclosure may refer to a person who uses an electronic device or a device (e.g., artificial intelligence electronic device) that uses an electronic device. In embodiments of the present disclosure, a module or programming module may include at least one of various elements of the present disclosure, exclude some of the elements, or may further include other additional elements. The operations performed by the modules, the programming module, or other elements, according to various embodiments, may be executed in a sequential, parallel, repetitive, or heuristic manner. Furthermore, some operations may be executed in a different order or may be omitted, or other operations may be added.

Hereinafter, an electronic device according to an embodiment of the present disclosure and an operating method thereof will be described with reference to the accompanying drawings. However, since the various embodiments are not restricted or limited by the following description, it should be noted that applications can be made to the various embodiments based on embodiments that will be described below.

FIG. 1 schematically illustrates a configuration of a system for providing a content according to various embodiments of the present disclosure.

Referring to FIG. 1, the system according to various embodiments of the present disclosure may include a server 100, a network 200, and an electronic device 300.

According to various embodiments, the server 100 may include various servers that provide contents to the electronic device 300. For example, the server 100 may include at least one of an integration server, a provider server, a content server, an Internet server, and a cloud server. According to various embodiments, the server 100 may provide a content or a demo content to the electronic device 300 according to a request of the electronic device 300.

According to various embodiments, the demo content may include a content which the user can directly experience (for example, a user experience) the corresponding content in advance before the content is actually downloaded and installed in the electronic device. According to various embodiments, the demo content may be generated and provided separately from the complete actual content, or may be provided in the form in which a part of the actual content (for example, a predetermined interval or a predetermined time (for example, N minutes where N is a natural number)) can be used (for example, played).

According to various embodiments, the server 100 may store and manage various contents, and may be implemented as one server 110 (for example, the integration server or the cloud server) which may directly provide various contents to the electronic device 300. Alternatively, according to various embodiments, the server 100 may be implemented as another external server 130 (for example, a provider server or a content server) that provides the actual content (for example, including the demo content) and the server 110 (for example, the integration server or a management server) that is connected to the other external server 130 through the network 150 (for example, a wireless network or a wired network) to receive a content from the other external server 130 and provides services such as a service for providing a recommended content to the electronic device 300 and a service for providing the demo content based on the received content. According to an embodiment, the server 110 may receive contents from content servers (for example, a first content server 131, a second content server 132, a third content server 133, and a fourth content server 134), respectively, through the network 150, and store and manage the received contents.

According to various embodiments, while one server 100 is generally described below, the service of the present disclosure can be implemented by a combination of one or more servers.

According to various embodiments, the electronic device 300 may access (be connected to) the server 100 through the network 200 (for example, wireless network), download a content from the server 100, and store or install the downloaded content. According to various embodiments, the electronic device 300 may receive a demo content from the server 100 in a streaming type and output the received demo content in the streaming type (for example, display or audio output). According to various embodiments, the electronic device 300 may provide a User Interface (UI) which allows the user to experience the demo content before downloading and installing an actual content through a link with the server 100. The electronic device 300 may interact with the user based on the user interface and transmit/receive data (or signals) according to the interaction to/from the server 100 through the network 200.

Figure 2:
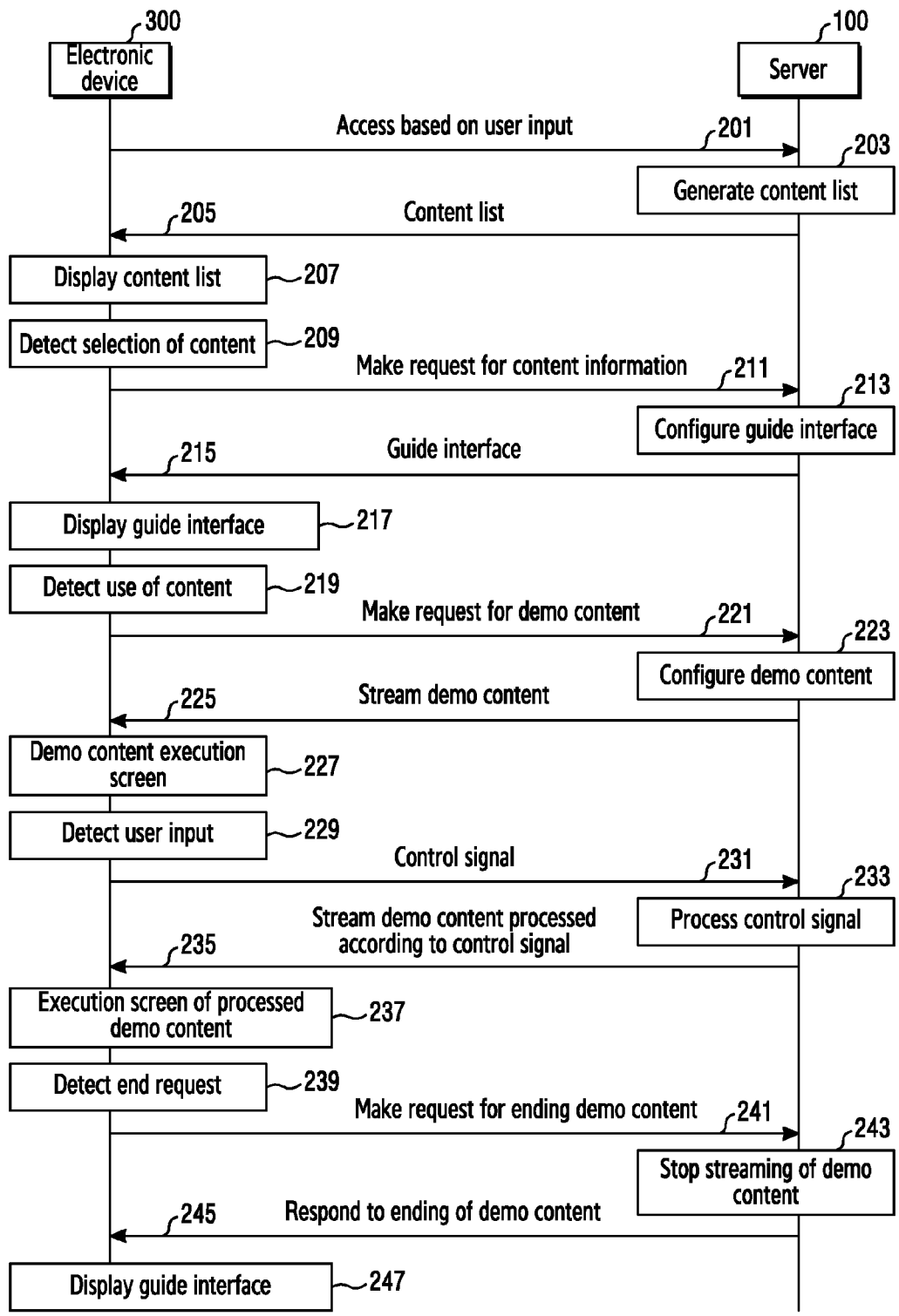
FIG. 2 illustrates a procedure for providing a content in a system according to various embodiments of the present disclosure.

FIG. 2 illustrates a procedure for providing a content in a system according to various embodiments of the present disclosure.

Referring to FIG. 2, the electronic device 300 may access the server 100 based on a user input in operation 201. According to various embodiments, the electronic device 300 may display a list screen of contents (for example, games and applications) provided by the server 100 when accessing the server 100. The user may search for (discover) a content of a category (for example, a game) which the user desires in the content list. The electronic device 300 may make a request for transmitting the content list corresponding to a user input (for example, a category selection) for searching for (discovering) the content to the server 100.

According to an embodiment, when a particular category item (for example, a game item) is selected from the list, the electronic device 300 may transmit a signal corresponding to the selected category to the server 100.

The server 100 may generate a content list in operation 203. For example, the server 100 may identify the signal (category corresponding to the user selection) received from the electronic device 300 in operation 203. The server 100 may extract contents (for example, action games) of the identified category (for example, a genre) as recommended contents, and provide a content list of the extracted recommend contents to the electronic device 300 in operation 205.

According to various embodiments, the server 100 may store and manage history information of the use of contents (for example, downloaded or played data) by the user of the electronic device 300. When the electronic device 300 accesses the server 100, the server 100 may determine history information corresponding to the electronic device 300, automatically extract recommended contents suitable for the user of the electronic device 300 based on the history information, and provide the content list. Alternatively, according to various embodiments, the electronic device 300 may store and mange history information of the use of the contents by the user and, when accessing the server 100, provide the history information to the server 100. The server 100 may provide the content list of the recommended contents based on the history information received from the electronic device 300.

According to various embodiments, the server 100 may provide a content list of all contents which the server 100 stores and manages to the electronic device 300 in response to the access of the electronic device 300.

The electronic device 300 may display the content list in operation 207. For example, the electronic device 300 may receive the content list of the recommended contents provided by the server 100 and display a list screen of the received content list.

According to various embodiments, the electronic device 300 may store and manage history information of the user of the contents by the user. The electronic device 300 may receive the content list of all contents which the server 100 stores and manages. The electronic device 300 may extract the recommended contents from the received content list based on the history information, and re-configure the content list based on the recommended contents and then display the content list.

When the electronic device 300 detects a selection of a content in the content list in operation 209, the electronic device 300 may transmit a request for transmission of content information to the server 100 in operation 211. For example, the user may select (touch) a particular content in the displayed content list. When the electronic device 300 detects a selection (for example, a touch) of the particular content in the content list, the electronic device 300 may transmit a request for content information of the selected content to the server 100. For example, the electronic device 300 may transmit a content selection signal to the server 100 in response to the selection of the particular content in the displayed content list.

The server 100 may configure a guide interface in operation 213, and transmit the guide interface to the electronic device 300 in operation 215. For example, the server 100 may identify the content (requested content) corresponding to the selection signal received from the electronic device 300 and generate a guide interface including various control objects related to detailed content information (for example, information such as an explanation of the content, user reviews, screen shots, and relevant images) of the identified content and a content use control. According to various embodiments, the control object may include an object (for example, a play button or an experience button) for pre-experience before the download of the corresponding content, that is, for performance of user experience, an object for navigating between different contents within the content list (for example, a back button for switching to a previous content and a next button for switching to a next content), an object for downloading or installing the corresponding content (for example, a download button and an install button), or an object (for example, a like button) for liking the corresponding content (for example, a save function for downloading the content later). According to various embodiments, the guide interface may be configured at or before a time point when the content list is provide and stored in the server 100, and the server 100 may search for a guide interface corresponding to the received selection signal and provide the found guide interface to the electronic device 300.

The electronic device 300 may display the guide interface received from the server 100 in operation 217. For example, the electronic device 300 may display a guide interface including detailed content information of the contents (for example, information on the explanation of the content, user reviews, screen shots, and relevant images) and control objects (for example, control objects including a back button, next button, play button, download button, and like button) related to content controls.

When the electronic device 300 detects the use of the content in the displayed guide interface, the electronic device 300 may transmit a request for executing the demo content to the server 100 in operation 221. For example, the user may select (for example, touch) the play button to perform user experience (for example, a pre-experience) before the corresponding content is downloaded in the displayed guide interface. When the electronic device 300 detects a user input for selecting the play button in the guide interface, the electronic device 300 may determine that the user input is for executing the demo content for experiencing the corresponding content before the download. The electronic device 300 may make a request for executing the demo content corresponding to the content to the server 100 based on the determination of the execution of the demo content.

The server 100 may configure the demo content in operation 223, and stream the demo content to the electronic device 300 in operation 225. For example, when the server 100 receives (detects) the request for executing the demo content from the electronic device 300, the server may generate the demo content corresponding to the content based on the content, or search for the pre-configured demo-content according to the content and provide the demo content to the electronic device 300 through a streaming service. According to various embodiments, the demo content may be implemented to use the actual content during a predetermined interval or for a predetermined time based on the actual content. According to various embodiments, the streaming service of the demo content may include a cloud-based service for playing the content in real time without downloading the content in the electronic device 300.

In operation 227, the electronic device 300 may receive the demo content streamed by the server 100 in a streaming type, and display an execution screen of the received demo content.

The electronic device 300 may detect a user input in operation 229. For example, the user may perform a control for an operation (for example, game play) of the demo content (for example, game demo content) displayed through the electronic device 300. According to an embodiment, the electronic device 300 may provide control buttons for controlling the game on the execution screen of the game demo content, and the user may input various controls for playing the game by using the control buttons.

The electronic device 300 may transmit a control signal corresponding to a user input to the server 100 in operation 231. For example, the user may select (for example, a touch) a particular control button in the displayed (executed) demo content. When the electronic device 300 detects the selection (for example, a touch) of the particular control button in the executed demo content, the electronic device 300 may transmit a control signal (selection signal) corresponding to the selected control button to the server 100.

When the server 100 receives the control signal from the electronic device 300, the server 100 may process the control of the demo content according to the received control signal in operation 233. For example, the server 100 may process (reflect) an operation (for example, play) according to the received control signal in the streamed game demo content.

The server 100 may stream the demo content in which the operation is processed (reflected) according to the control signal to the electronic device 300 in operation 235.

The electronic device 300 may receive the streamed demo content in which the operation is processed (reflected) according to the control signal in the streaming type and display an execution screen of the received demo content in operation 237. According to various embodiments, operations 227, 229, 231, 233, 235, and 237 may be repeatedly performed before expiration of a predetermined range of the demo content (for example, an interval, period, and time) and before ending the use of the demo content by the user.

The electronic device 300 may detect a request for ending the demo content based on a user input in operation 239. For example, the user may determine whether to download the actual content corresponding to the demo content based on the user experience as described above on the basis of the demo content. According to various embodiments, when determining to download the actual content by the demo content, the user may download and install the content in real time based on a user input for the download. Alternatively, when determining to download the actual content, the user may register (for example, like) the corresponding content as a target to be downloaded based on a user input for the collective download after navigation of contents. Alternatively, the user may perform navigation (for example, screen switching) for displaying another content (for example, a guide interface of another content) based on a user input for searching for (discovering) the other content without determining to download the actual content. When the user input is detected, the electronic device 300 may process the corresponding operation and determine the user input as a request for ending the executed demo content.

The electronic device 300 may transmit a request for ending the demo content to the server 100 in operation 241. For example, the electronic device 300 may transmit the end signal for ending the demo content to the server 100 in response to a user input for ending the demo content during the execution of the demo content.

When receiving the end signal of the demo content from the electronic device 300, the server 100 may stop streaming of the demo content in response to the received end signal in operation 243. According to various embodiments, when stopping streaming of the demo content, the server 100 may stop streaming of the demo content at a time point when the end signal is received, configure a guide interface on the screen where the demo content is stopped, and provide the guide interface to the electronic device 300. Alternatively, according to various embodiments, when stopping streaming of the demo content, the server 100 may generate an interface of a result of the performed operation and provide the interface to the electronic device 300.

The server 100 may transmit an end response to the demo content to the electronic device 300 in response to the end request of the electronic device 300 in operation 245. For example, the server 100 may stop streaming of the demo content, insert a control object related to a content control into a stop screen of the stopped demo content, and transmit the screen to the electronic device 300.

The electronic device 300 may display the demo content stop screen including the control object in operation 247. For example, the electronic device 300 may insert the control object into the demo content stop screen and provide the screen. According to various embodiments, the electronic device 300 may switch the screen to the guide interface as described in operation 215 and provide the guide interface. Thereafter, the electronic device 300 may perform corresponding operations corresponding to downloading the actual content based on a user input detected based on the control object, registering the like to download the actual content, and navigating to a previous content or a next content.

According to various embodiments, stopping of the execution of the demo content may be determined and processed by the server 100 rather than the request of the electronic device 300. For example, when the server 100 detects expiration of a predetermined range (or interval, period, or time) of the demo content while the demo content is streamed, the server 100 may determine to stop the streaming of the demo content. When determining to stop the streaming of the demo content, the server 100 may process an operation corresponding to operation 243 and provide information related to the stopping of the demo content to the electronic device 300.

The electronic device 300 according to various embodiments may include a wireless communication module, a display, a memory, and a process functionally connected to the wireless communication module, the display, and the memory, and the processor may be configured to display a guide interface for a content, to determine a download or execution of the content based on a user input made using the guide interface, to receive a demo content from an external device and display the demo content in response to the execution of the content, and to download the content from the external device in response to the download of the content.

According to various embodiments, the demo content may include a content streamed by an external device to allow the user to experience the content in advance before the content is downloaded. According to various embodiments, the guide interface may include detailed content information corresponding to the content and a control object related to a content use control. According to various embodiments, the control objects may be configured to include a first object for performing user experience of the content, a second object for navigating between difference contents within the content list, a third object for downloading the content, a fourth object for liking the content, and a fifth object for toggling the control objects.

According to various embodiments, when a user input for the first object is detected, the processor may be configured to make a request for a demo content corresponding to the content to the external device and to provide the execution of the content by the reception of the demo content streamed from the external device.

According to various embodiments, when a user input by the first object is detected, the processor may be configured to switch the guide interface to an execution screen of the demo content and to process signal transmission/reception corresponding to the user input through a link with the external device during the execution of the demo content.

According to various embodiments, the processor may be configured to display a guide interface of a previous content or a next content of the content through a link with the external device when a user input by the second object is detected, to download the content through the like with the external device when a user input by the third object is detected, and to register the content in a wish list through the link with the external device when a user input by the fourth object is detected.

A server 100 according to various embodiments may include: a wireless communication module; a memory; and a processor functionally connected to the wireless communication module and the memory, wherein the processor streams a demo content to an external device in response to a request for the demo content of the external device, detects whether to stop the demo content during the streaming of the demo content, stops the streaming of the demo content when it is determined to stop the use of the demo content, and process a content download, content navigation, or content like registration according to a content request when the content request is detected after the streaming of the demo content is stopped.

According to various embodiments, the processor may be configured to provide a content list of recommended contents to the external device based on history information of a user of the external device for the content use and to receive a request for downloading the content or executing the demo content based on the content list.

According to various embodiments, when a request for executing the demo content is received, the processor may be configured to generate the demo content corresponding to the content based on the content or search for a pre-configured demo content corresponding to the content, and to provide the generated or found demo content to the external device through a streaming service. According to various embodiments, the streaming service may include a cloud-based service for playing the content in real time without downloading the content in the external device.

According to various embodiments, the processor may be configured to determine to stop the use of the demo content according to detection of expiration of a predetermined range of the demo content or reception of a request for ending the demo content of the external device during the streaming of the demo content.

Figure 3:
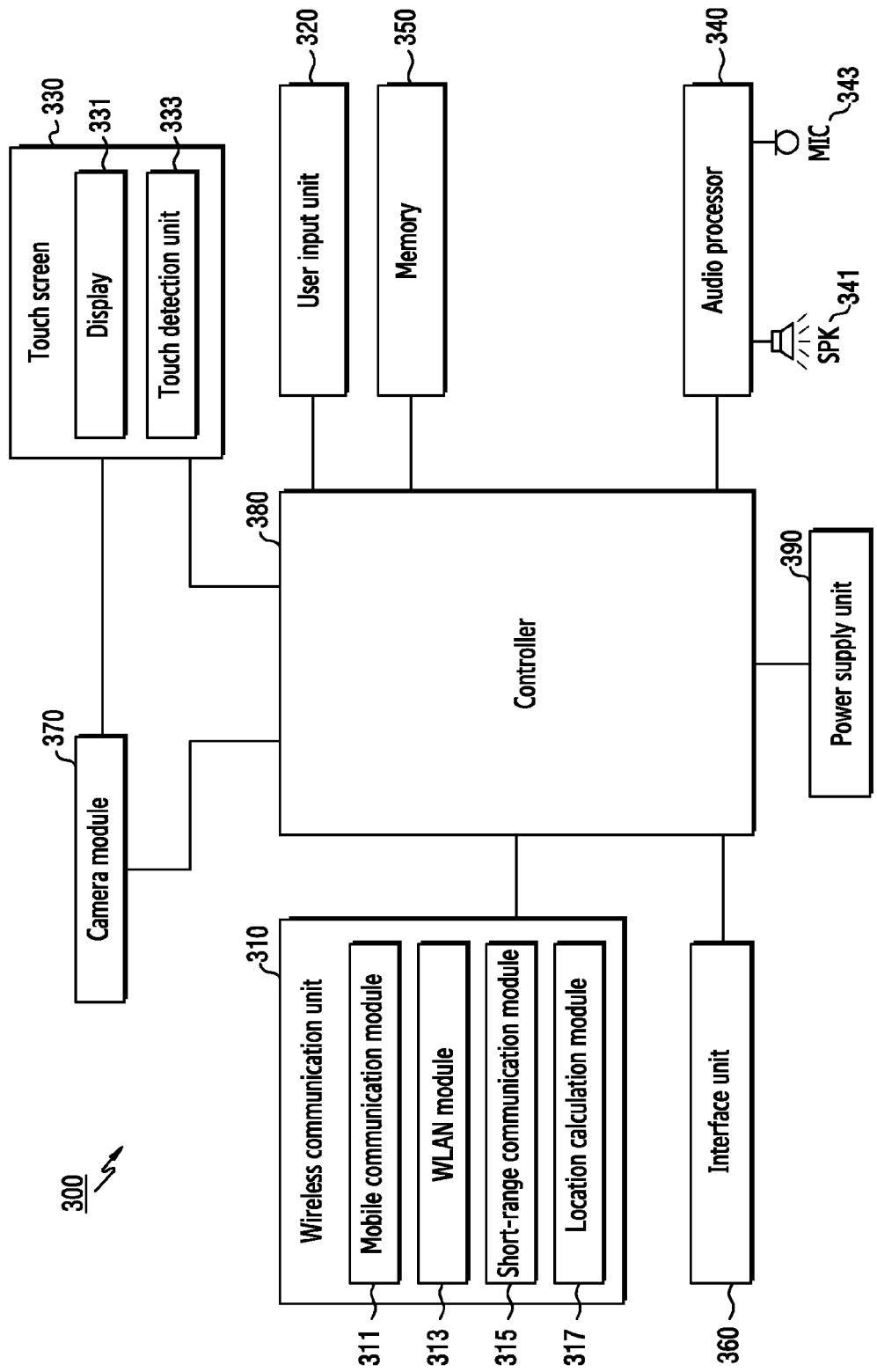
FIG. 3 schematically illustrates a configuration of an electronic device according to various embodiments of the present disclosure.

FIG. 3 schematically illustrates a configuration of an electronic device according to various embodiments of the present disclosure.

Referring to FIG. 3, the electronic device 300 according to various embodiments of the present disclosure may include a wireless communication unit 310, a user input unit 320, a touch screen 330, an audio processor 340, a memory 350, an interface unit 360, a camera module 370, a controller 380, and a power supply unit 390. According to various embodiments of the present disclosure, the electronic device 300 may include fewer or more elements when compared to the elements of FIG. 3 since the elements of FIG. 3 are not essential.

The wireless communication unit 310 may include one or more modules that allow wireless communication between the electronic device 300 and another external device (for example, another electronic device or a server). For example, the wireless communication unit 310 may include a mobile communication module 311, a Wireless Local Area Network (WLAN) module 313, a short range communication module 315, and a location calculation module 317.

The mobile communication module 311 may transmit and receive a wireless signal to and from at least one of a base station, an external electronic device, and various servers (for example, integration server, provider server, content server, Internet server, or cloud server) on a mobile communication network. The wireless signal may include a voice call signal, video call signal, or data in various forms according to the transmission and reception of text/multimedia messages.

The mobile communication module 311 may receive one or more pieces of data (for example, contents, messages, mail, images, dynamic images, weather information, location information, time information and the like). According to an embodiment, the mobile communication module 311 may be connected to at least one external device (for example, another electronic device or a server) which is connected to the electronic device 300 through a network (for example, a mobile communication network), so as to acquire (receive) various types of data. The mobile communication module 311 may transmit various types of data required for the operation of the electronic device 300 to the external device (for example, a server or another electronic device) in response to a user request.

The mobile communication module 311 may transmit and receive a wireless signal based on various communication schemes. For example, the communication schemes may include Long-Term Evolution (LTE), LTE-Advance (LTE-A), Global System for Mobile communication (GSM), Enhanced Data GSM Environment (EDGE), Code Division Multiple Access (CDMA), Wideband CDMA (WCDMA), Universal Mobile Telecommunications System (UMTS), or Orthogonal Frequency Division Multiple Access (OFDMA) but are not limited thereto.

The WLAN module 313 may be a module for establishing wireless internet access and a WLAN link with another external device. The WLAN module 313 may be installed inside or outside the electronic device 300. Wireless Internet technology may include Wi-Fi, wireless broadband (Wibro), world interoperability for microwave access (WiMax), high speed downlink packet access (HSDPA), millimeter wave (mmWave), or the like.

The WLAN module 313 may transmit or receive various pieces of data of the electronic device 300 to or from an external device through a link with another external device (for example, another electronic device or a server) connected to the electronic device 300 through a network (for example, wireless Internet network). The WLAN module 313 may always be maintained in an on-state, or may be turned on based on settings of the electronic device 300 or a user input.

The short-range communication module 315 may be a module for performing short-range communication. Bluetooth, Bluetooth Low Energy (BLE), Radio Frequency Identification (RFID), Infrared Data Association (IrDA), Ultra Wideband (UWB), ZigBee, Near Field Communication (NFC), or the like may be used as a short range communication technology.

The short-range communication module 315 may transmit or receive various pieces of data of the electronic device 300 to or from another electronic device through a link with the other electronic device connected to the electronic device 300 through a network (for example, a short-range communication network). The short-range communication module 315 may always be maintained in an on-state, or may be turned on based on settings of the electronic device 300 or a user input.

The location calculation module 317 is a module for obtaining a location of the electronic device 300, and may include a Global Position System (GPS) module as a representative example. The location calculation module 317 may measure the location of the electronic device 300 based on the principle of triangulation. For example, the location calculation module 317 may calculate three dimensional current location information according to a latitude, a longitude, and an altitude, by calculating distance information and time information of the location away from three or more base stations and then applying trigonometry to the calculated information. Alternatively, the location calculation module 317 may calculate location information by continuously receiving location information of the electronic device 300 from three or more satellites in real time. The location information of the electronic device 300 may be obtained by various methods.

The user input unit 320 may generate input data for controlling the operation of the electronic device 300 in response to a user input. The user input unit 320 may include at least one input device for detecting various user inputs. For example, the user input unit 320 may include a keypad, a dome switch, a physical button, a touch pad (resistive type/capacitive type), a jog & shuttle, and a sensor.

According to various embodiments, the sensor may, for example, measure a physical quantity or detect an operational state of the electronic device 300 to convert the measured or detected information into an electrical signal. The sensor may include, for example, an iris scan sensor, a finger scan sensor, an image sensor, or an illuminance sensor. Further, the sensor may include at least one of a gesture sensor, a gyro sensor, a pressure sensor, a magnetic sensor, an acceleration sensor, a terrestrial sensor, a motion recognition sensor, a grip sensor, a proximity sensor, a color sensor (for example, RGB (red, green, blue) sensor), a medical sensor, a temperature-humidity sensor, a Ultra Violet (UV) sensor, and a Heart Rate Monitor (HRM) sensor. In addition, the sensor may include, for example, an E-nose sensor, an electromyography (EMG) sensor, an electroencephalogram (EEG) sensor, an electrocardiogram (ECG) sensor, and an infrared (IR) sensor.

Some parts of the user input unit 320 may be implemented in a button form on an outer region of the electronic device 300, or some or all parts of the user input unit 120 may also be implemented as a touch panel. The user input unit 320 may receive a user input for initiating the operation of the electronic device 300 (for example, execution of the content based on user experience or download of the content) according to various embodiments of the present disclosure and generate an input signal according to the user input. For example, the user input unit 320 may receive various user inputs for executing a content, executing an application, inputting (making or inserting) data, changing the position of the electronic device 300, connecting a network, and transmitting or receiving data, and may generate an input signal according to the user input.

The touch screen 330 may correspond to an input/output means for simultaneously performing an input function and a display function and may include a display 331 and a touch detection unit 333. The touch screen 330 may provide an input/output interface between the electronic device 300 and the user, transfer a user's touch input to the electronic device 300, and serve as a medium that shows an output from the electronic device 300 to the user. The touch screen 330 may show a visual output to the user. The visual output may be shown in the form of text, graphics, video, and a combination thereof. According to various embodiments, the touch screen 330 may display various screens according to the operation of the electronic device 300 through the display 331. For example, the various screens may include a content screen, a demo content screen, a content list screen, a messenger screen, a phone call screen, a game screen, a video reproduction screen, a gallery screen, a web page screen, a home screen, an electronic device connection screen, or the like.

The touch screen 330 may detect an event (for example, a touch event, a proximity event, a hovering event, or an air gesture event) based on at least one of a touch, hovering, and air gesture by the user through the touch detection unit 333 while a particular screen is displayed through the display 331, and transfer an input signal according to the event to the controller 380. The controller 380 may distinguish the transferred event and control an operation according to the distinguished event.

The display 331 may display (output) various pieces of information processed by the electronic device 300. For example, the display 331 may display a UI or a Graphical UI (GUI) related to the operation of the electronic device 300 that provides a user experience-based content. According to a rotation direction (or an orientation direction) of the electronic device 300, the display 331 may support a screen display by a landscape mode, a screen display by a portrait mode, or a screen display according to a change between the landscape mode and the portrait mode. The display 331 may use various displays. For example, the display 331 may include a Liquid Crystal Display (LCD), a Light-Emitting Diode (LED) display, an Organic Light-Emitting Diode (OLED) display, an Active Matric OLED (AMOLED), a MicroElectroMechanical Systems (MEMS) display, and an electronic paper display. Some displays may be implemented as a transparent display in a transparent or photo-transparent type. Some displays may include a bent display or a flexible display that can be twisted or bent based on a paper-thin and flexible substrate without any damage.

The touch detection unit 333 may be seated on the display 331 and detect a user input that makes contact or approaches the surface of the touch screen 330. The user input may include a touch event or a proximity event that is input based on at least one of a single-touch, a multi-touch, hovering, and an air gesture. According to various embodiments, the touch detection unit 333 may receive a user input for initiating an operation related to the use of the electronic device 300 and generate an input signal according to the user input. For example, the user input may be made in the type of a touch, a tap, drag, sweep, flick, drag&drop, drawing gesture (for example, writing), and the like.

The touch detection unit 333 may be configured to convert a pressure applied to a particular portion of the display 331 or a change in capacitance generated on a particular portion of the display 331 into an electrical input signal. The touch detection unit 333 may detect a location and an area of the surface of the display 331 which an input means (for example, a user's finger, an electronic pen, or the like) touches or approaches. The touch detection unit 333 may be implemented to also detect the pressure of the touch according to the applied touch scheme.

The audio processor 340 may transmit, to a speaker (SPK) 341, an audio signal received from the controller 380, and may perform a function of transferring an audio signal such as a voice received from a microphone (MIC) 343 to the controller 380. The audio processor 340 may convert voice/sound data into an audible sound to output the audible sound through the speaker 341 under the control of the controller 380 and convert an audio signal such as a voice received from the microphone 343 into a digital signal to transfer the digital signal to the controller 380. The audio processor 340 may output an audio signal corresponding to a user input according to audio processing information (for example, an effect sound, a music file, or the like) inserted into data.

The speaker 341 may output audio data received from the wireless communication unit 310 or stored in the memory 350. The speaker 341 may output sound signals related to various operations (functions) performed by the electronic device 300. Although not illustrated in an embodiment of the present disclosure, attachable and detachable earphones, headphones, or a headset may be connected to the speaker 341 of the electronic device 300 through an external port.

The microphone 343 may receive an external sound signal and process the sound signal into electric voice data. Various noise reduction algorithms may be implemented in the microphone 343 to remove noise generated in the process of receiving an external sound signal. The microphone 343 may serve to receive an input of audio stream such as a voice command (for example, a voice command for initiating an operation such as content execution, demo content execution, and content download). The microphone 343 may convert a voice signal into an electrical signal. According to various embodiments, the microphone 343 may include an internal microphone installed inside the electronic device 300 and an external microphone connected to the electronic device 300.

The memory 350 may store one or more programs executed by the controller 380 and also perform a function of temporarily storing input/output data. The input/output data may include, for example, contents, history information of a user, messenger data (for example, conversation data), contact information (for example, landline or mobile phone numbers), messages, media files (for example, audio, dynamic image, image, and photo files). The memory 350 may serve as store acquired data, and may store the acquired data in a temporary storage device in real time and store data of which storage is fixed in a storage device for a long time storage.

The memory 350 may store various programs and data related to a content providing function based on user experience of the electronic device 300. For example, the memory 350 may store one or more programs for executing the demo content and processing a download of the actual content and data processed according to the one or more programs. The memory 350 may store instructions to perform a function about whether to download the actual content according to user experience based on the demo content.

The memory 350 may store various pieces of information related to a use frequency (for example, content use frequency), importance, and priority according to the operation of the electronic device 300. The memory 350 may permanently or temporarily store an Operating System (OS) of the electronic device 300, a program related to an input and display control using the touch screen 330, a program related to a control of various operations (functions) of the electronic device 300, and various pieces of data generated by the operations of the programs.

The memory 350 may include an expanded memory (for example, external memory) or an internal memory. The memory 350 may include at least one type of storage medium of a flash memory type memory, a hard disk type memory, a micro type memory, a card type memory (for example, a Secure Digital (SD) card, an eXtream Digital (XD) card, or the like), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk. The electronic device 300 may also operate in relation to a web storage performing a storage function of the memory 350 on the Internet.

The memory 350 may store various software. For example, software components may include an operating system software module, a communication software module, a graphic software module, a user interface software module, a Moving Picture Experts Group (MPEG) module, a camera software module, and one or more application software modules. Further, since the module, which is the component of software, may be expressed as a set of instructions, the module may be also expressed as an instruction set. The module may be also expressed as a program.

The operating system software module may include various software components for controlling a general system operation. Controlling the general system operation may refer to, for example, managing and controlling a memory and controlling and managing power. Further, the operating system software module may perform a function of smoothly executing communication between various hardware (devices) and software components (modules).

The communication software module may allow the electronic device to communicate with another electronic device such as a computer, a server, or a portable terminal through the wireless communication unit 310. Further, the communication software module may be formed in a protocol structure corresponding to a corresponding communication scheme.

The graphic software module may include various software components for providing and displaying graphics on the touch screen 330. The term "graphics" is used to have a meaning including text, web pages, icons, digital images, videos, and animation.

The user interface software module may include various software components related to a User Interface (UI). For example, the user interface software module may include the content indicating how a state of the user interface is changed or indicating a condition under which the change in the state of the user interface is made.

The MPEG module may include a software component which enables a digital content (for example, video and audio data)-related process and functions thereof (for example, generation, play, distribution, and transmission of contents).

The camera software module may include a camera-related software component which enables camera-related processes and functions.

The application module may include a web browser including a rendering engine, email, instant message, word processing, keyboard emulation, address book, widget, Digital Right Management (DRM), iris scan, context cognition, voice recognition, and a location-based service. According to various embodiments, the application module may execute the demo content for user experience before the actual content is downloaded (installed) through a link with the server 100, and process an operation (function) for downloading the actual content based on a result according to the user experience of the demo content or performing navigation of another demo content.

The interface unit 360 may serve as an interface between the electronic device 300 and all external devices connected to the electronic device 300. The interface unit 360 may receive data from an external device, or receive power and transfer the power to each element within the electronic device 300. The interface unit 360 may transmit data within the electronic device 300 to an external device. For example, the interface unit 360 may include a wired/wireless headset port, an external charger port, a wired/wireless data port, a memory card port, a port for connecting a device provided with an identification module, an audio input/output port, a video input/output port, an earphone port, and the like.

The camera module 370 refers to an element for supporting a photographing function of the electronic device 300. The camera module 370 may photograph a predetermined subject and transfer the photographed data (for example, an image) to the display 331 and the controller 380 according to a control of the controller 380. The camera module 370 may include one or more image sensors. For example, the camera module 370 may include a front sensor (for example, a front camera) located on the front surface of the electronic device 300 (the same plane as the display 331) and a rear sensor (for example, a rear camera) located on the rear surface (for example, the back surface) of the electronic device 300.

The controller 380 may control the general operation of the electronic device 300. For example, the controller 380 may perform various controls related to execution of a streamed content (for example, cloud-based content execution), a voice call, data communication, and video communication. The controller 380 may be implemented as one or more processors or may be referred to as a processor. For example, the controller 380 may include a Communication Processor (CP), an Application Processor (AP), an interface (for example, General Purpose Input/Output: GPIO), or an internal memory, as a separate element, or integrate them into one or more integrated circuits. The AP may perform various functions for the electronic device 300 by executing various software programs. The CP may perform processing and control for voice communication and data communication. Further, the controller 380 may serve to execute a particular software module (instruction set) stored in the memory 350 and perform various particular functions corresponding to the module.

According to various embodiments, the controller 380 may execute the demo content for user experience before the actual content is downloaded (installed) through a link with the server 100, and control operations related to downloading the actual content based on a result according to the user experience of the demo content, performing navigation of another demo content, or performing a function of registration (like registration) in a location list of the content. According to various embodiments, the controller 380 may perform the function of the electronic device 300 according to an embodiment of the present disclosure through links with software modules stored in the memory 350. The control operation of the controller 380 according to various embodiments of the present disclosure will be described with reference to the drawings described below.

The controller 380 according to an embodiment of the present disclosure may control various operations related to a general function of the electronic device 300 in addition to the aforementioned functions. For example, when a particular application is executed, the controller 380 may control an operation and a screen display thereof. Further, the controller 380 may receive input signals corresponding to various touch event or proximity event inputs supported by a touch-based or proximity-based input interface (for example, the touch screen 330) and may control execution of functions according to the received input signals. In addition, the controller 380 may control transmission/reception of various types of data based on wired communication or wireless communication.

The power supply unit 390 may receive external power and internal power and supply power required for operating the elements under the control of the controller 380. According to an embodiment of the present disclosure, the power supply unit 390 may supply or block power to the display 331, the camera module 370, and the wireless communication unit 310 under a control of the controller 380.

The various embodiments of the present disclosure may be implemented in a recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

According to various embodiments, a recording medium may include a computer-readable recording medium having a program recorded therein to execute operations of executing a demo content for user experience before an actual content is downloaded (installed), downloading the actual content based on a result according to the user experience of the demo content, and registering (like-registering) a location list of contents.

In some cases, the embodiments described in the present specification may be implemented by the controller 380 itself. For software implementation, the embodiments such as procedures and functions described in this specification may be implemented by separate software modules. The software modules may perform one or more functions and operations described in the present specification.

According to various embodiments, at least some of the functions performed by the electronic device 300 may be performed by an external device thereof (for example, the server 100). For example, the server 100 may include a processing module (for example, a processor) corresponding to the controller 380, and may process at least some of the functions related to supporting a content service based on a demo content in which the user can experience various operations corresponding to an actual content, that is, a demo content for performing user experience before the content is downloaded based at least some of information transmitted by the electronic device 300 through the processing module and transmit a result thereof to the electronic device 300. Although not illustrated, the server 100 may include at least some elements (for example, the memory, the processor, and the wireless communication module) corresponding to the elements of the electronic device 300 illustrated in FIG. 3.

Figure 4:
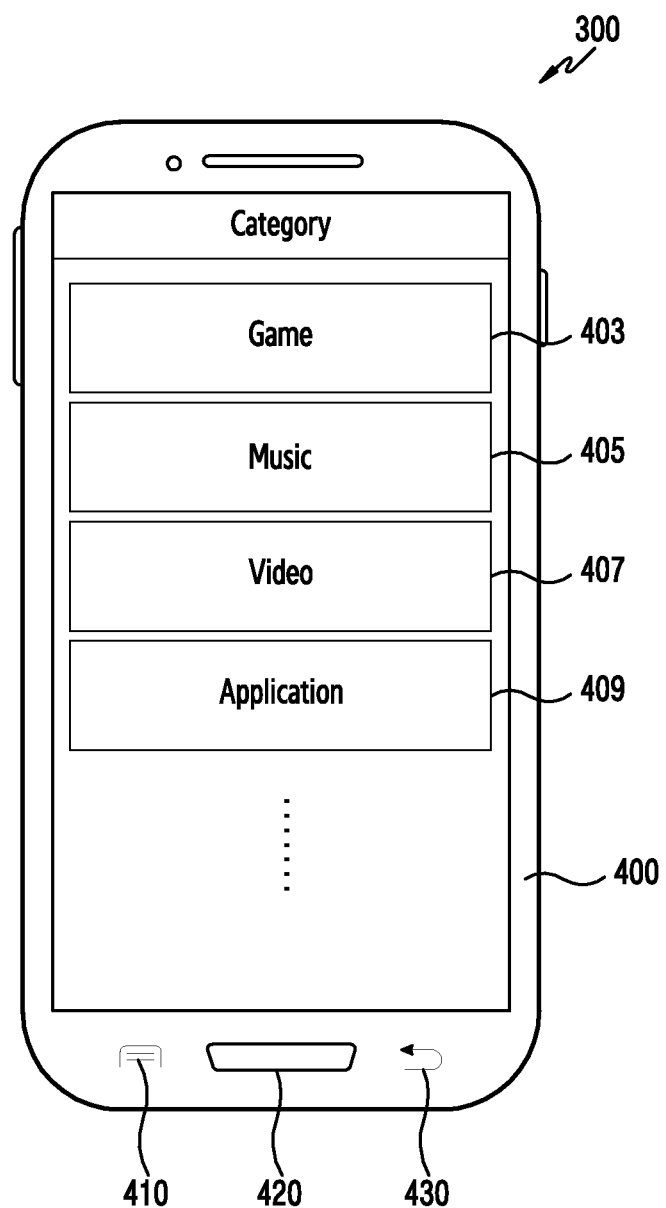
FIGS. 4, 5, 6, and 7 illustrate examples of a user interface according to various embodiments of the present disclosure.
Figure 5:
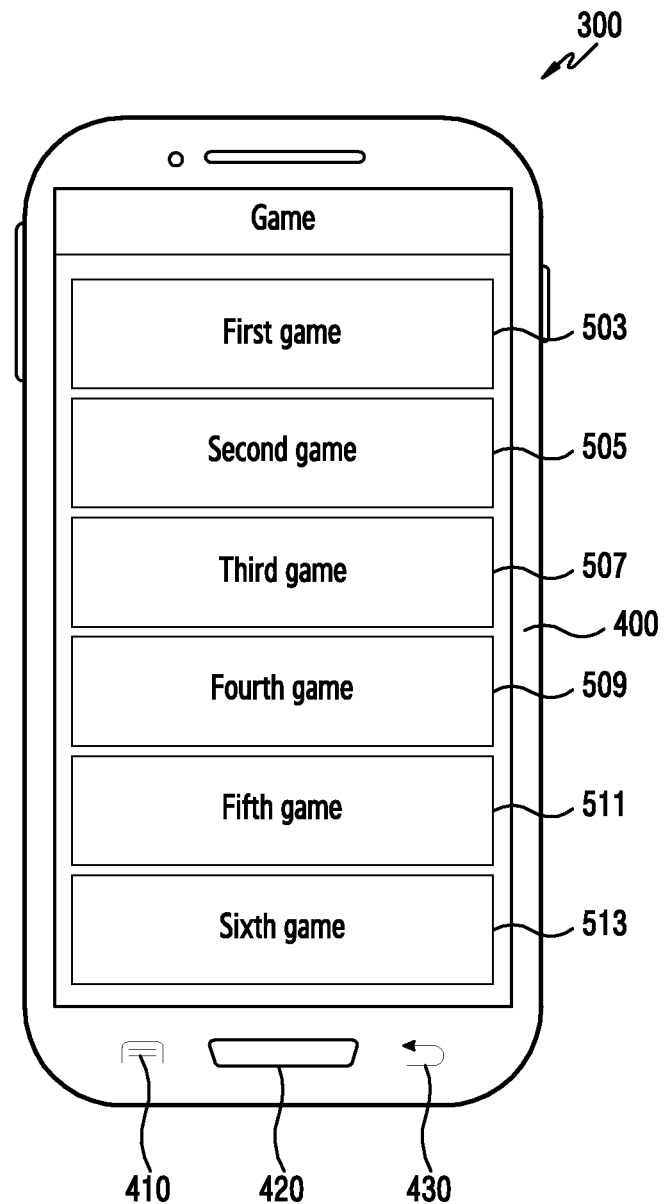

FIGS. 4 and 5 illustrate examples of a user interface according to various embodiments of the present disclosure.

Referring to FIGS. 4 and 5, FIG. 4 illustrates a screen example for providing a list of content categories, and FIG. 5 illustrates a screen example for providing a list of contents of a particular content category (for example, a game category) according to a user's selection.

According to various embodiments, content categories (for example, games 403, music 405, videos 407, applications 409, and the like) of FIG. 4 may be recommended and provided by the electronic device 300 or the server 100 based on history information on the use of contents by the user.

According to various embodiments, contents (for example, first game 503, second game 505, third game 507, fourth game 509, fifth game 511, and sixth game 513) of a particular content (for example, a game category) of FIG. 5 may be recommended and provided by the electronic device 300 or the server 100 based on history information on the use of contents by the user.

As illustrated in FIGS. 4 and 5, the electronic device 300 may include a housing (or body) 400 and additional devices 410, 420, and 430 formed on the housing 400 to perform the function of the electronic device 300. According to various embodiments, the additional devices may include a recently executed app button 410, a home button 420, and a cancel button 430. Although not illustrated, the additional devices may further include a first speaker, a second speaker, a microphone, a sensor (for example, a front camera module and an illumination sensor), a communication interface (for example, a charging or data input/output port and an audio input/output port), and a power button.

According to various embodiments, the recently executed app button 410 may indicate a button for displaying a recently executed application list in the electronic device 300. The home button 420 may indicate a button for directly performing various functions according to user settings for the home button 420 including a function for moving to the home screen. According to various embodiments, the home button 420 may include a fingerprint recognition sensor for recognizing a fingerprint. The cancel button 430 may indicate a button for canceling the execution of an executed application or content or including a back function. According to various embodiments, the cancel button 430 may include a function for switching between displayed lists (for example, category list <-> content list) and switching to the content list from a state where the guide interface is displayed.

According to various embodiments, the electronic device 300 may switch to and display the content list (for example, game lists) as illustrated in FIG. 5 in response to detection of selection (for example, a touch) of the particular category 403 (for example, a game) in the state where the category list is displayed as illustrated in FIG. 4. According to various embodiments, the electronic device 300 may switch to and display the category list as illustrated in FIG. 4 in response to selection (for example, a touch) of the cancel button 430 in the state where the particular list (for example, game lists of FIG. 5) is displayed. According to various embodiment, function execution corresponding to the cancel button 430 may be performed by a voice command input, a motion input using the electronic device 300, a touch-based gesture input, or an input of an icon in the list.

Figure 6:
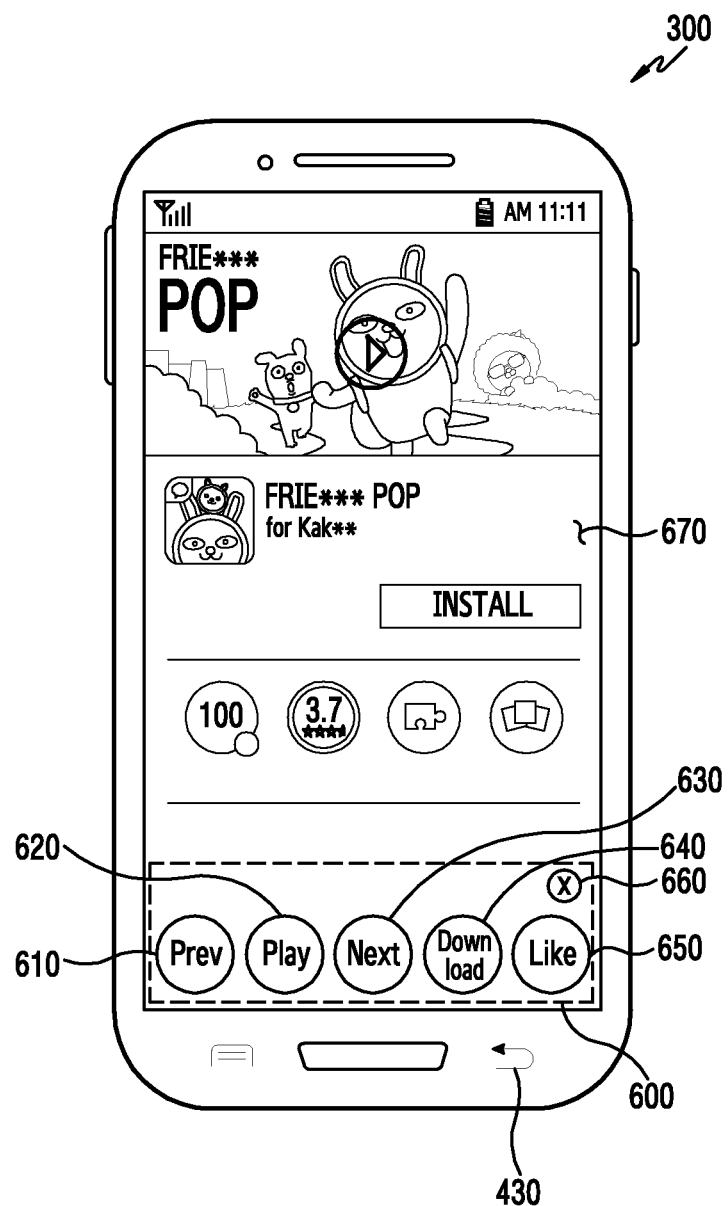
Figure 7:
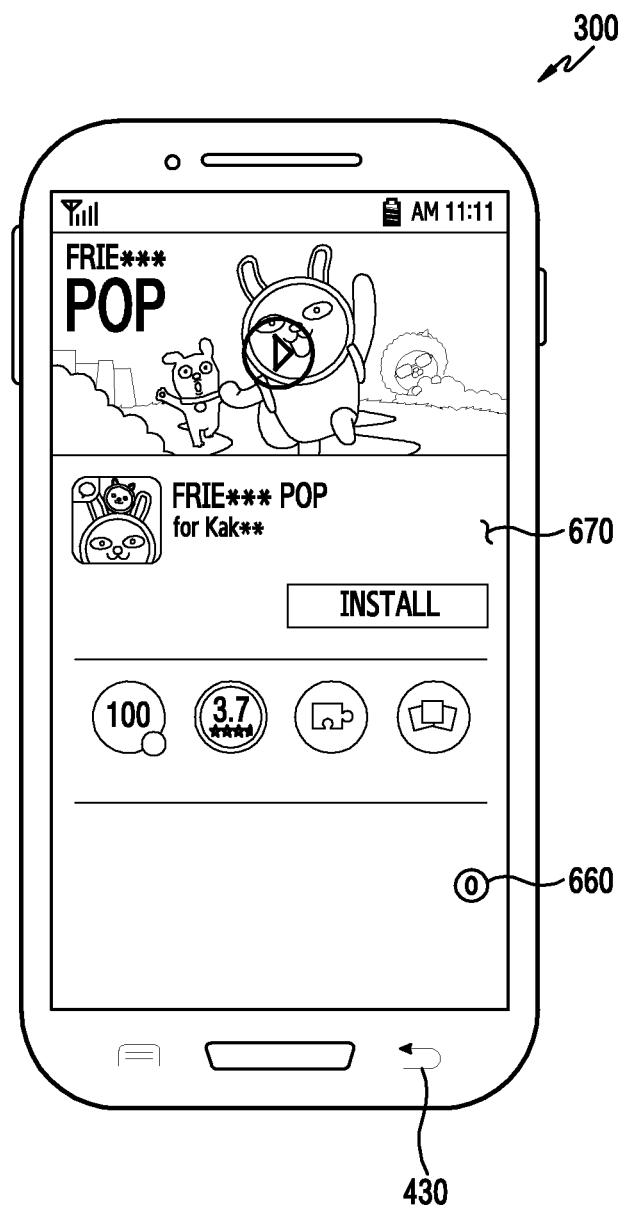

FIGS. 6 and 7 illustrate examples of a user interface according to various embodiments of the present disclosure.

Referring to FIGS. 6 and 7, FIG. 6 illustrates a screen example for providing a guide interface, and FIG. 7 illustrates a screen example when a demo content is executed.

According to various embodiments, when detecting selection of an item of a particular content (for example, the third game 507) by the user in the state where the content list illustrated in FIG. 5 is displayed, the electronic device 300 may display a guide interface of the selected content. According to various embodiments, the guide interface may include detailed content information 670 of the selected content (for example, information on the explanation of the content, user reviews, screen shots, and relevant images) and various control objects 600 for controlling the content as described in the part of FIG. 1.

According to various embodiments, the control objects 600 may include an object 620 (for example, a play button or an experience button) for pre-experience before the content is downloaded, that is, for performance of user experience, objects 610 and 630 for navigation between different contents within the content list (for example, a back button 610 for switching to a previous content and a next button 630 for switching to a next content), an object 640 for downloading or installing the content (for example, a download button and an install button), or an object 650 (for example, a like button) for liking the corresponding content (for example, a save function for downloading a content later). According to various embodiments, the control objects 600 may include a toggle object 660 (for example, a toggle button) for toggling (for example, turning on/off or activating/deactivating) the objects 610, 620, 630, 640, and 650 of the control objects 600.

According to various embodiments, the electronic device 300 may deactivate (or turn off) and display the control objects 600 as illustrated in FIG. 7 in response to detecting a selection (for example, a touch) of the toggle object 660 in a state where the control objects 600 are activated (or turned on) as illustrated in FIG. 6. In this case, the guide interface may display the detailed content information 670 and provide the toggle object 660 in an area where the detailed content information 670 is displayed. According to various embodiments, the toggle object 660 may be provided in an icon form (for example, circle X,⊗) indicating switching to deactivation (or off) in an active state of the control objects 600 as illustrated in FIG. 6, and provided in an icon form (for example, double circle, ◎) indicating switching to activation (or on) in an inactive state of the control objects 600 as illustrated in FIG. 7.

According to various embodiments, the on/off toggle of the control objects 600 may be automatically performed according to whether the demo content is executed or not. For example, the user may select (for example, touch) the play button 620 in the control objects 660 of the guide interface to execute the demo content. When the electronic device 300 detects the selection of the play button 620, the electronic device 300 may receive streaming of the demo content and display an execution screen of the demo content through a link with the server 100. When the electronic device 300 displays the execution screen of the demo content, the electronic device 300 deactivates the control objects 600 so as not to display the control objects 600 on the execution screen, and provide the toggle object 660 in an area of the execution screen of the demo content as illustrated in the example of FIG. 7.

According to various embodiments, in the state of FIG. 6 or 7, when the electronic device 300 detects selection (for example, a touch) of the cancel button 430, the electronic device 300 may switch the screen to the list screen and provide the content list as illustrated in FIG. 5.

According to various embodiments, in the state of FIG. 6, the user may perform navigation of other contents by using the back button 610 and the next button 630. For example, when it is assumed that the currently displayed content is the third content 507 of FIG. 5, the user may make a request for switching the content to the second content 505 by the selection of the back button 610 and the electronic device 300 may display a guide interface related to the second content 505 in response to the selection of the back button 610. Further, the user may make a request for switching the content to the fourth content 509 by the selection of the next button 630 and the electronic device 300 may display a guide interface related to the fourth content 509 in response to the selection of the next button 630. According to various embodiments, when the guide interface of each content is provided according to the performance of the content navigation by the user, detailed content information corresponding to the corresponding content may be provided and the control objects 600 may be provided in an area where each piece of detailed content information is displayed. For example, the detailed content information may be changed in accordance with the corresponding content based on the content switching, and the control objects 600 may be fixedly provided regardless of the content switching. According to various embodiments, the content navigation may be performed for contents included in the list of the recommended contents as illustrated in FIG. 5.

According to various embodiments, in the state of FIG. 6, the user may download the currently displayed content by using the download button 640. According to various embodiments, the content download may be performed while the demo content is executed. For example, the user may call the control objects 600 by using the toggle object 660 while using the demo content, and download the content by using the download button 640 of the control objects 600.

According to various embodiments, in the state of FIG. 6, the user may register the like of the currently displayed content by using the like button 650. According to various embodiments, the registration of the like of the content may be also performed while the demo content is executed. For example, the user may call the control objects 600 by using the toggle object 660 while using the demo content, and download the content by using the download button 640 of the control objects 600.

According to various embodiments, when the electronic device 300 detects selection of the toggle object 660 while the demo content is executed (for example, the example of FIG. 7), the electronic device 300 may display the control objects 600 on the execution screen of the demo content. According to various embodiments, stopping of the execution of the demo content may be performed by a link between the electronic device 300 and the server 100 (for example, transmission and reception of a stop signal).

Figure 8A:
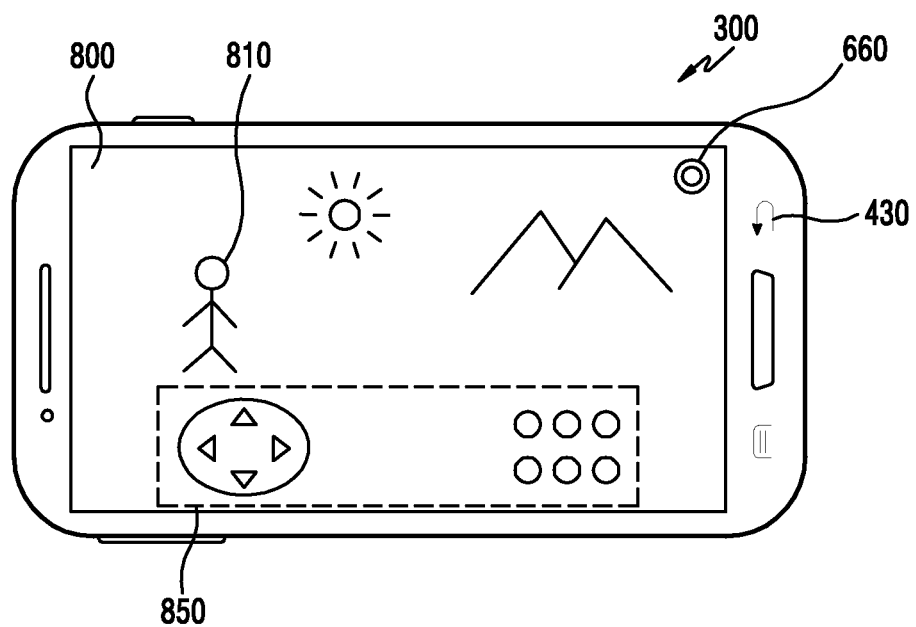
FIGS. 8A, 8B and 9 illustrate screen examples for executing a demo content in an electronic device according to various embodiments of the present disclosure.
Figure 8B:
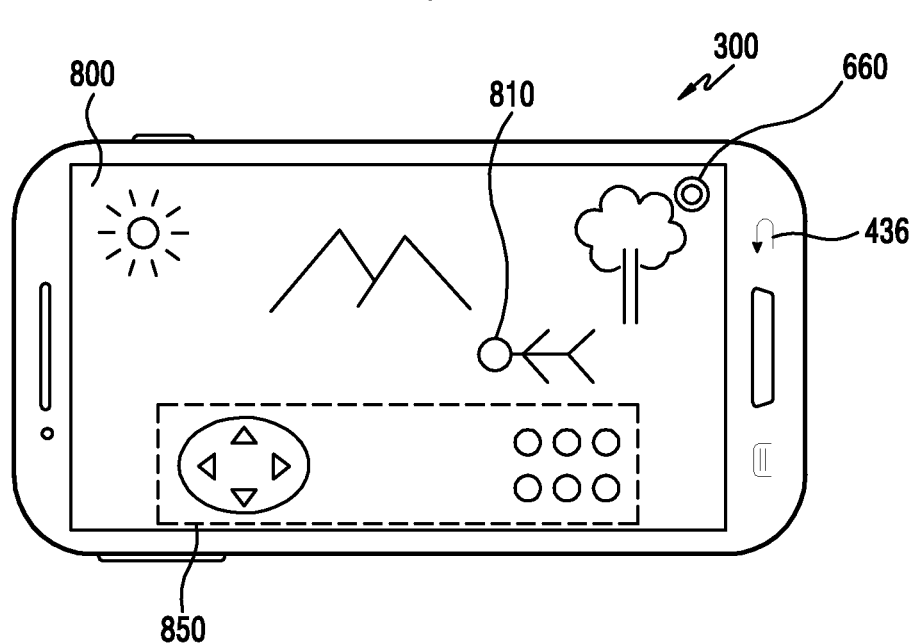
Figure 9:
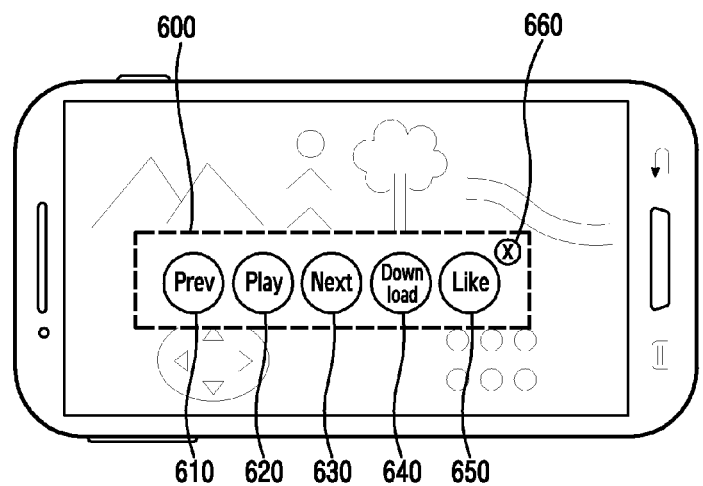

FIGS. 8A, 8B and 9 illustrate screen examples for executing a demo content in an electronic device according to various embodiments of the present disclosure.

Referring to FIGS. 8A and 8B, FIGS. 8A and 8B illustrate a screen example in which the electronic device 300 receives a demo content (for example, a game content) streamed from the server 100 and provides the received demo content. For example, the user may select (for example, touch) the play button 620 of the control objects 600 for user experience of the provided content. When the electronic device 300 detects the selection of the play button 620, the electronic device 300 may receive streaming of the demo content (for example, a game content) and display the execution screen of the demo content like the example of FIGS. 8A and 8B.

As illustrated in FIGS. 8A and 8B, on the execution screen of the demo content, the control objects 600 may be deactivated and the toggle object 660 may be provided in an area of the execution screen of the demo content. Further, when the demo content is executed, content control objects 850 (for example, game control buttons) may be provided on the execution screen of the demo content along with the switching of the control objects 600 from the active state to the inactive state.

The user may experience in advance the actual content through the demo content as if the actual content is downloaded (or installed) and used in the electronic device 300. For example, in order to control the demo content (for example, a game content) that changes in real time according to streaming, the user may make an input through the content control objects 850 (for example, control buttons).

As illustrated in the screen example of FIG. 8A, the user may select (for example, touch) a particular control button of the content control objects 850 to control an operation (for example, sliding operation) of a game object 810 (for example, a human shaped object). The electronic device 300 may transmit a control signal of the control button corresponding to a user input to the server 100. The server 100 may control the demo content in accordance with the control signal (for example, process the sliding operation of the game object 810). The server 100 may reflect a result of the control in the streamed demo content and provide the demo content to the electronic device 300, and the electronic device 300 may provide an execution screen of the demo content in which the result of the control has been reflected as illustrated in the example of FIG. 8B.

According to various embodiments, the demo content may be provided as if the actual content is used. Further, the execution of the demo content may be stopped according to a determination of the electronic device 300 or the server 100. For example, when the electronic device 300 detects switching to the activation of the control objects 600 through the toggle object 660, the electronic device 300 may determine that the execution of the demo content ends. When the electronic device 300 detects a user input through the cancel button 430 of the electronic device 300, the electronic device 300 may determine that the execution of the demo content ends. When the electronic device 300 detects reception of an end signal of the demo content from the server 100, the electronic device may determine that the execution of the demo content ends. The server 100 may determine whether a predetermined range (or interval, period, or time) of the streamed demo content expires. When the expiration of the demo content is determined, the server 100 may stop the streaming of the demo content and provide an end signal according to the stop to the electronic device 300.

As illustrated in the screen examples of FIGS. 8A and 8B, the execution of the demo content may be stopped according to one of the aforementioned conditions while the demo content is executed. According to various embodiments, when the execution of the demo content is stopped, the electronic device 300 may provide information related to the stopping of the demo content through a link with the server 100. For example, when the execution of the demo content is stopped during the execution as illustrated in the examples of FIGS. 8A and 8B, the control objects 600 may be automatically activated and provided on the execution screen of the demo content as illustrated in an example of FIG. 9.

Referring to FIG. 9, the control objects 600 may be provided on the screen where the execution of the demo content is stopped. According to various embodiments, when the demo content is stopped, the screen switches to the guide interface as illustrated in FIG. 6 and the control objects 600 may be provided.

Figure 10:
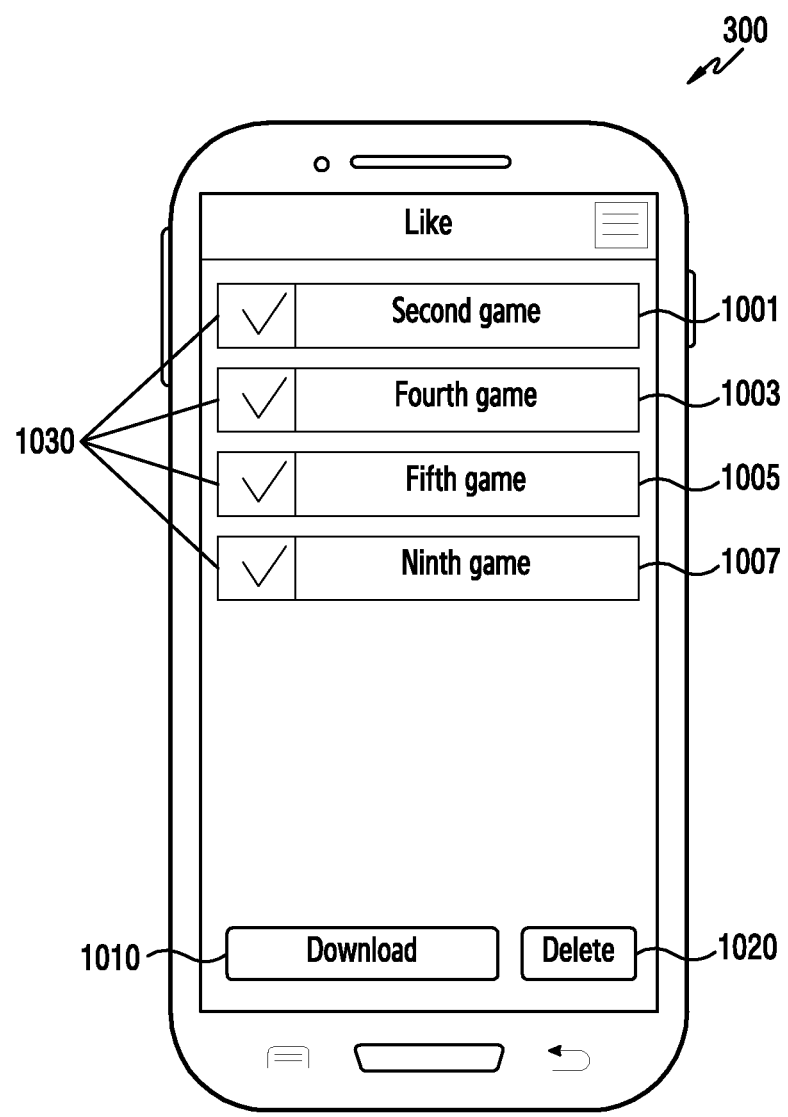
FIG. 10 illustrates an example of a wish list in an electronic device according to various embodiments of the present disclosure.

FIG. 10 illustrates an example of a wish list in an electronic device according to various embodiments of the present disclosure.

Referring to FIG. 10, FIG. 10 illustrates an example of a list (for example, a wish list) of contents of which like registration (for example, a like button 650) is selected with respect to at least some of the contents within the content list of FIG. 10 while the user performs user experience through a cloud-based demo content.

FIG. 10 illustrates a screen example when contents of a second game 1001, a fourth game 1003, a fifth game 1005, and a ninth game 1007 are like-registered among the contents (for example, games) of the content list of FIG. 5. When the electronic device 300 detects a user input through a download button 1010 in the wish list, the electronic device 300 may collectively or selectively download contents registered in the wish list through the link with the server 100. When the electronic device 300 detects a user input through a deletion button 1020 in the wish list, the electronic device 300 may collectively or selectively delete the contents registered in the wish list.

The user may select a target to be downloaded or deleted from the contents registered in the wish list. For example, the user may designate a target content by selection of a check button 1030, and then select the download button 1010 or the deletion button 1020. When the content of the wish list is downloaded or deleted, the electronic device 300 may process the performance of a corresponding operation (collectively or selectively download or delete) based on the target content selected based on the check button 1030.

Figure 11:
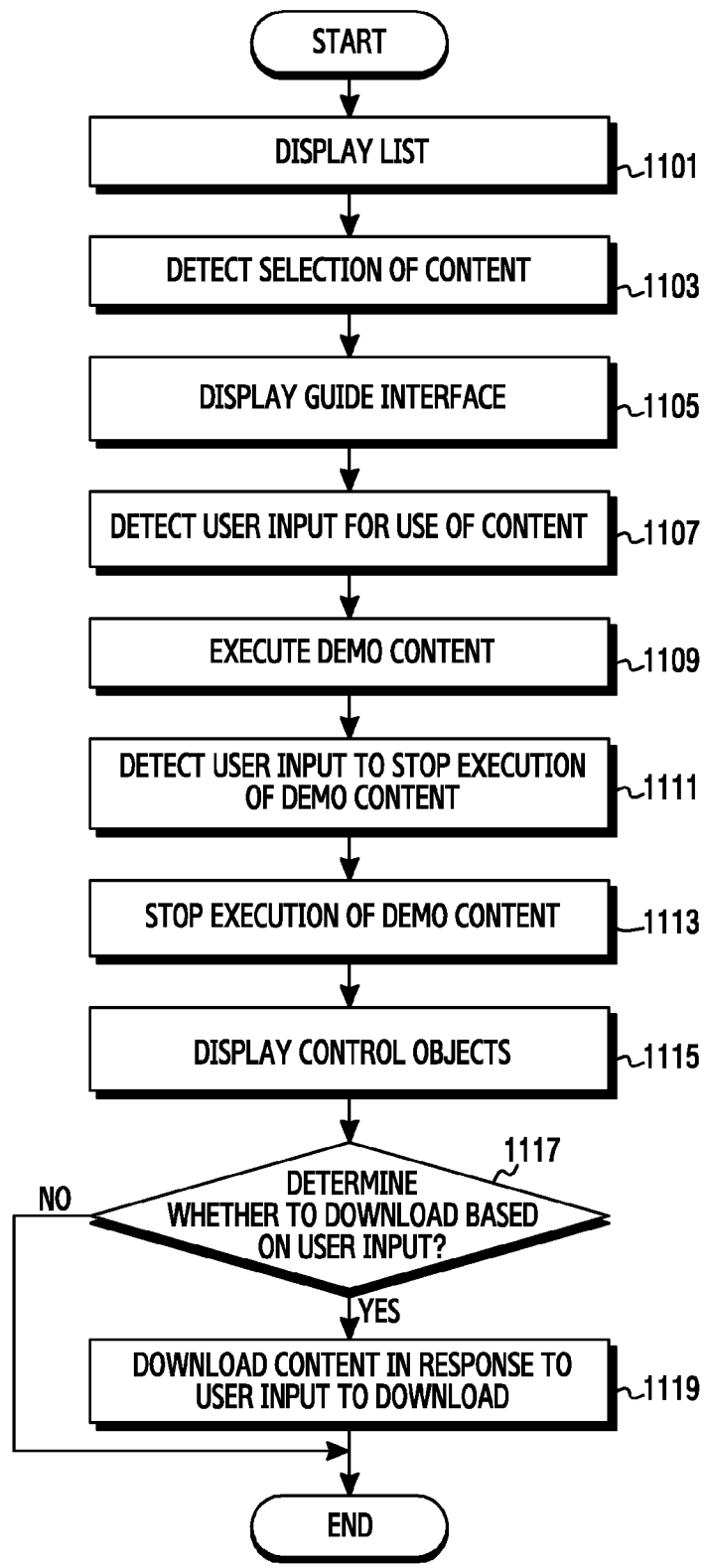
FIG. 11 is a flowchart illustrating an operation example of an electronic device according to various embodiments of the present disclosure.

FIG. 11 is a flowchart illustrating an operation example of an electronic device according to various embodiments of the present disclosure.

Referring to FIG. 11, in operation 1101, the controller 380 of the electronic device 300 may display a content list. For example, the controller 380 may receive a content list of recommended contents provided by the server 100 and make a control to display a list screen of the received content list. Alternatively, the controller 380 may receive a content list of contents which the server 100 stores and manages. The controller 380 may extract recommended contents from the received contents list based on the history information stored in the memory 350 and re-configure a content list based on the recommended contents, and then make a control to display the content list.

In operation 1103, the controller 380 may detect selection of the content. For example, the controller 380 may detect a user input for selecting (for example, touching) a particular content from the displayed content list. When the selection of the content is detected, the controller 380 may transmit a request for content information on the selected content to the server 100. For example, the controller 300 may generate a selection signal of the selected content in response to the selection of the content from the content list and transmit the selection signal to the server 100.

In operation 1105, the controller 380 may display a guide interface. For example, the controller 380 may receive the guide interface from the server 100 in response to the detection of the selection of the content and display the received guide interface. According to various embodiments, the guide interface may include detailed content information of the contents (for example, information on the explanation of the content, user reviews, screen shots, and relevant images) and control objects (for example, control objects including a back button, next button, play button, download button, and like button) related to content controls.

In operation 1107, the controller 380 may detect a user input for using the content. For example, the user may select (for example, touch) a play button for performing user experience (for example, pre-experience) in the demo content corresponding to the content before the content is downloaded in the guide interface. When a user input for selecting the play button is detected in the control objects of the guide interface, the controller 380 may determine the user input as the execution of the demo content to experience the content before the download of the content. The controller 380 may make a request for executing the demo content corresponding to the content to the server 100 based on the determination on the execution of the demo content.

In operation 1109, the controller 380 may execute the demo content. For example, the controller 380 may receive streaming of the demo content transmitted by the server 100 and to display an execution screen of the received demo content. According to various embodiments, the controller 380 may control the demo content according to various control signals of the user to display the demo content while the demo content is executed.

In operation 1111, the controller 380 may detect the stop of the execution of the demo content. For example, the controller 380 may detect the stop of the execution of the demo content by a request of the user or the server 100. When switching to the activation of the control objects is detected through the toggle object during the execution of the demo content, the controller 380 may determine to stop the execution of the demo content. When a user input is detected through the cancel button of the electronic device 300, the controller 380 may determine to stop the execution of the demo content. When reception of an end signal of the demo content from the server 100 is detected, the controller 380 may determine to stop the execution of the demo content. The stop of the execution of the demo content by the server 100 may be determined according to whether a predetermined range (or interval, period, or time) of the demo content expires.

In operation 1113, the controller 380 may stop the execution of the demo content through the link with the server 100.

In operation 1115, the controller 380 may display control objects through an execution stop screen of the demo content or a guide interface screen. For example, when the execution of the demo content is stopped, the controller 380 may automatically activate the control objects and provide the control objects on the execution screen of the demo content. Alternatively, when the execution of the demo content is stopped, the controller 380 may switch the screen to the guide interface, automatically activate the control objects, and provide the control objects on detailed content information of the guide interface.

In operation 1117, the controller 380 may determine whether to download the actual content. For example, the user may determine whether to download the actual content according to a result of use experience of the actual content based on the demo content. When it is determined to download the actual content, the user may make a request for downloading the actual content by using the download button of the control objects. When a user input is detected through the download button, the controller 380 may determine to download the actual content.

In operation 1119, the controller 380 may process an operation for downloading the content through the link with the server 100 according to the determination on the download of the content. According to various embodiments, the controller 380 may process the operation of automatically installing the downloaded content or storing the downloaded content in the memory 350 according to the type of the downloaded content.

Meanwhile, the controller 380 may perform corresponding operations corresponding to performing like registration for the download of the actual content or navigation of a pervious content or a next content as well as downloading the content based on the detected user input based on the control objects.

Figure 12:
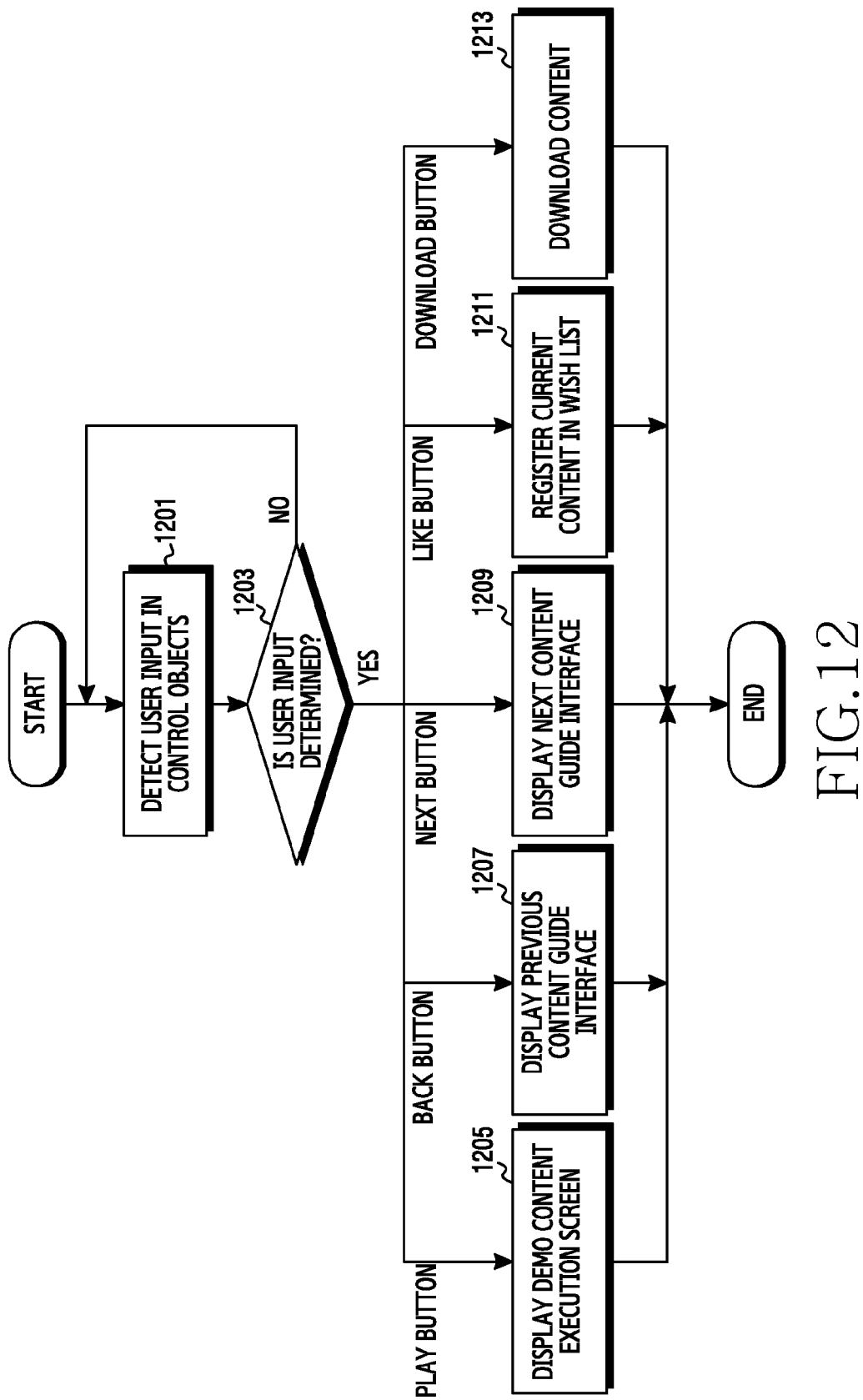
FIG. 12 is a flowchart illustrating an operation example of an electronic device according to various embodiments of the present disclosure.

FIG. 12 is a flowchart illustrating an operation example of an electronic device according to various embodiments of the present disclosure.

Referring to FIG. 12, in operation 1201, the controller 380 may detect a user input in the displayed control objects 600. For example, the control objects 600 may be displayed through a guide interface screen, demo content execution screen, or a demo content execution stop screen according to a user or may be automatically displayed according to an operation between the electronic device 300 and the server 100. The user may select a particular object related to the use of the content in the control objects 600 displayed through the electronic device 300.

In operation 1203, the controller 380 may determine a user input detected in the control objects 600. For example, the controller 380 may determine whether the user input through the control objects 600 is detected on the play button 620, the back button 610, the next button 630, the like button 650, the download button 640, or the toggle button 660.

When the controller 380 determines the detection of the user input by the play button 620 in operation 1203, the controller 380 may process an operation related to displaying the demo content execution screen through the link with the server 100 in operation 1205.

When the controller 380 determines the detection of the user input by the back button 610 in operation 1203, the controller 380 may process an operation related to displaying detailed content information of the previous content and the guide interface including the control objects 600 through the link with the server 100 in operation 1207.

When the controller 380 determines the detection of the user input by the next button 630 in operation 1203, the controller 380 may process an operation related to displaying detailed content information of the next content and the guide interface including the control objects 600 through the link with the server 100 in operation 1209.

When the controller 380 determines the detection of the user input by the like button 650 in operation 1203, the controller 380 may process an operation related to registering (like-registering) the currently provided (displayed) content in the wish list in operation 1211.

When the controller 380 determines the detection of the user input by the download button 640 in operation 1203, the controller 380 may process an operation related to downloading the currently provided (displayed) content through the link with the server 100 through the link with the server 100 in operation 1203.

Although not illustrated in FIG. 12, when the controller 380 detects the user input by the toggle button 660, the controller 380 may process an operation related to activating/deactivating the control objects 600.

As described above, the electronic device 300 according to various embodiments may include: a process of displaying a guide interface for a content; a process of detecting a user input based on the guide interface; a process of determining a download or an execution of the content based on the user input; a process of receiving a demo content from an external device and displaying the demo content in response to the execution of the content; and a process of downloading the content from the external device in response to the download of the content.

According to various embodiments, the demo content may include a content streamed by an external device to allow the user to experience the content in advance before the content is downloaded. According to various embodiments, the guide interface may include detailed content information corresponding to the content and control objects related to a content use control. According to various embodiments, the control objects may include a first object for performing user experience of the content, a second object for navigation between difference contents within the content list, a third object for downloading the content, a fourth object for like selection of the content, and a fifth object for toggling the control objects.

According to various embodiments, the process of displaying the demo content may include an operation of, when a user input by the first object is detected, making a request for a demo content corresponding to the content to the external device and executing the content by the reception of the demo content streamed from the external device, an operation of, when a user input by the second object is detected, displaying a guide interface of a previous content or a next content of the content through a link with the external device, an operation of when a user input by the third object is detected, downloading the content through the link with the external device, and an operation of when a user input by the fourth object is detected, registering the content in a wish list through the link with the external device.

Figure 13:
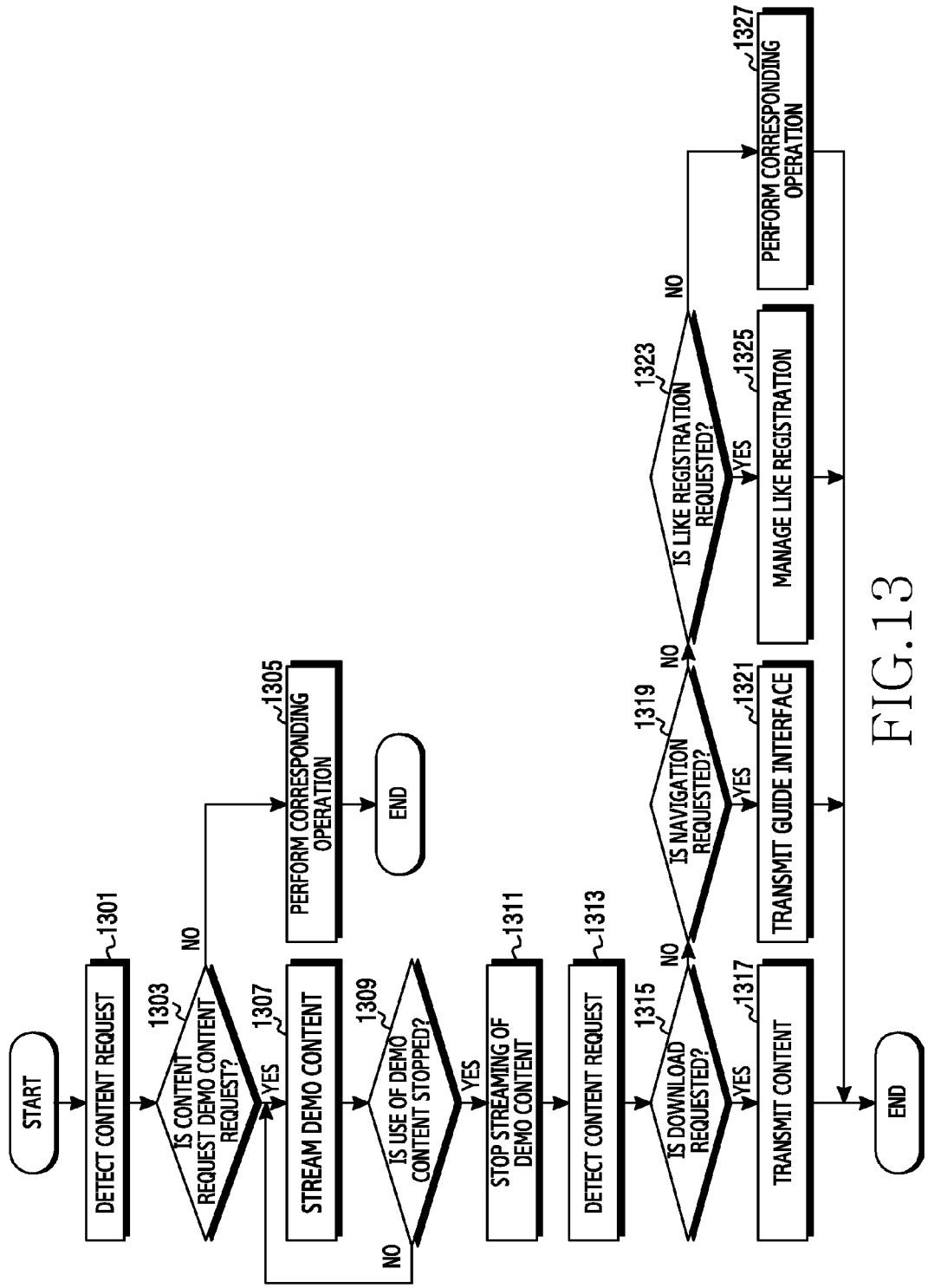
FIG. 13 is a flowchart illustrating an operation example of a server according to various embodiments of the present disclosure.

FIG. 13 is a flowchart illustrating an operation example of a server according to various embodiments of the present disclosure.

Referring to FIG. 13, in operation 1301, the server 100 may detect a content request from the electronic device 300. For example, the server 100 may provide a content list of recommended contents suitable for the user based on history information of the user of the electronic device 300 for the content use to the electronic device 300. The electronic device 300 may make a request for a content corresponding to content download or demo content execution to the server 100 based on a user input using the content list.

In operation 1303, the server 100 may determine whether the content request of the electronic device 300 corresponds to a demo content request. For example, the server 100 may determine whether the request corresponds to a request for transmitting the demo content that allows the user to experience the actual content in advance before the electronic device 300 downloads the actual content, that is, the demo content for performing user experience.

When the server 100 determines that the content request does not correspond to the demo content request in operation 1303 (No in operation 1303), the server 100 may process the performance of a corresponding operation in operation 1305. For example, the server 100 may process an operation related to transmitting the content corresponding to the request to the electronic device 300 or transmitting detailed information of the content corresponding to a content navigation request to the electronic device 300.

When the server 100 determines that the content request corresponds to the demo content request in operation 1303 (Yes in operation 1303), the server 100 may transmit streaming of the demo content to the electronic device 300 in operation 1307. For example, when the server 100 receives (detects) a request for executing the demo content from the electronic device 300, the server 100 may generate a demo content corresponding to the content based on the content (for example, at least some intervals of the content or play time of at least some of the content) or searches for a demo content pre-configured according to the content, and provide the demo content to the electronic device 300 through the streaming service. According to various embodiments, the demo content may be implemented to use the actual content during a predetermined interval or for a predetermined time based on the actual content. According to various embodiments, the streaming service of the demo content may include a service for playing the content in real time without downloading the content in the electronic device 300.

In operation 1309, the server 100 may determine whether to stop the use of the demo content. For example, the server 100 may check whether a predetermined range (or interval, period, or time) of the demo content expires while the demo content is streamed. Alternatively, when the electronic device 300 detects a request for ending the demo content based on a user input, the electronic device 300 may transmit a request for stopping the use of the demo content to the server 100, and the server 100 may check whether the request for stopping the use of the demo content is received from the electronic device 300.

When the stop of the use of the demo content is not detected in operation 1309 (No in operation 1309), the server 100 proceeds to operation 1307 and performs the operations below operation 1307.

When the server 100 determines to stop the use of the demo content in operation 1309 (Yes in operation 1309), the server 100 may stop the streaming of the demo content in operation 1311. For example, when the predetermined range of the demo content expires or when the server 100 receives the request for stopping the use of the demo content from the electronic device 300, the server 100 may determine to stop the streaming of the demo content. When the server 100 determines to stop the streaming of the demo content, the server 100 may stop the streaming of the demo content for the electronic device 300.

When the server 100 detects a content request in operation 1313, the server 100 may determine that the content request corresponds to a download request, a navigation request, or a like registration request in operation 1315, operation 1319, and operation 1323, respectively. For example, the electronic device 300 may transmit request signals corresponding to downloading the actual content, like-registration for the download of the actual content, and navigation of the previous content or the next content to the server 100 based on a user input.

When the server 100 determines that the content request corresponds to the download request in operation 1315 (Yes in operation 1315), the server 100 may process an operation related to transmitting the actual content corresponding to the demo content to the electronic device 300 in operation 1317.

When the server 100 determines that the content request corresponds to the navigation request in operation 1319 (Yes in operation 1319), the server 100 may process an operation related to transmitting detailed content information of the previous content or the next content of the current content and the guide interface including the control objects 600 to the electronic device 300 according to a request of the electronic device 300 in operation 1321.

When the server 100 determines that the content request corresponds to the like registration request in operation 1323 (Yes in operation 1323), the server 100 may process an operation related to like registration of the actual content corresponding to the demo content in operation 1325. For example, the server 100 may register (like-register) and manage the actual content corresponding to the demo content executed through the link with the electronic device 300 in the wish list of the electronic device 300 to allow the actual content to be downloaded later.

When the server 100 determines that the content request does not correspond to the download, navigation, and like registration in operation 1315, operation 1319, and operation 1323, the server 100 may process the corresponding operation in operation 1327. For example, the server 100 may receive a request for a content of another category from the electronic device 300, and process an operation related configuring a content list of recommended contents for the requested category, and transmitting the content list to the electronic device 300. When configuring the content list, the server 100 may configure the content list based on history information of the use of the content by the user of the electronic device 300.

As described above, the server 100 according to various embodiments may process an operation including a process of streaming a demo content to an external device in response to a request for the demo content of the external device, an operation of detecting whether to stop the use of the demo content during the streaming of the demo content, a process of, when there is a determination to stop the use of the demo content, stopping the streaming of the demo content, and a process of, when a content request is detected after the streaming of the demo content is stopped, processing a content download, content navigation, or content like registration according to the content request.

According to various embodiments, the server 100 may perform a process of providing a content list of recommended contents to the external device based on history information of a user of the external device for the content use and a process of receiving a request for downloading the content or executing the demo content based on the content list.

According to various embodiments, when a request for executing the demo content is received, the server 100 may perform a process of generating the demo content corresponding to the content based on the content or searching for a pre-configured demo content corresponding to the content and a process of providing the generated or found demo content to the external device through a streaming service. According to various embodiments, the streaming service may include a cloud-based service for playing the content in real time without downloading the content in the external device.

According to various embodiments, the server 100 may perform a process of determining to stop the use of the demo content according to detection of expiration of a predetermined range of the demo content or reception of a request for ending the demo content of the external device during the streaming of the demo content.

An electronic device and an operation method thereof according to various embodiments of the present disclosure may recommend contents suitable for the user based on a content use history of the user. According to various embodiments of the present disclosure, the user may experience in advance the recommended content (for example, a game) through User Experience (UX) before the content is downloaded and installed in the electronic device, thereby more effectively determine whether to install the corresponding content. According to various embodiments of the present disclosure, the user may experience in advance the content, which has not been installed in the electronic device, based on a cloud before the content is installed in the electronic device, and register the like to download the corresponding content during the pre-experience before the installation of the content or more conveniently perform a real time download. Further, the user may more rapidly and conveniently search for another content of the same category during the pre-experience of the content.

According to various embodiments of the present disclosure, it is possible to improve user convenience to use the content and also improve usability, convenience, accessibility, and competitiveness according to the improved user convenience by implementing a system and an electronic device capable of providing the content by user experience.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a wireless communication module;
a display;
a memory; and
a processor configured to:
receive, via the wireless communication module, a content list including at least one recommended content from an external device, wherein the at least one recommended content is determined based on history information regarding content used by a user of the electronic device;
control the display to display the content list;
upon detecting an input for selecting a content from the content list, control the display to display a guide interface for the content;
determine a download or execution of the content based on a user input through the guide interface;
receive, via the wireless communication module, a demo content from an external device and displays the demo content in response to the execution of the content; and
download, via the wireless communication module, the content from the external device in response to the download of the content.

2. The electronic device of claim 1, wherein the demo content includes a content streamed by the external device to allow pre-experience of the content before the content is downloaded.

3. The electronic device of claim 2, wherein the guide interface includes detailed content information corresponding to the content and control objects related to content use controls.

4. The electronic device of claim 3, wherein the control objects include a first object for performing user experience of the content, a second object for navigating between different contents within a content list, a third object for the download of the content, a fourth object for like selection of the content, and a fifth object for toggling the control objects.

5. The electronic device of claim 4, wherein, when a user input by the first object is detected, the processor is configured to:
request a demo content corresponding to the content to the external device; and
provide the execution of the content by receiving the demo content streamed from the external device.

6. The electronic device of claim 4, wherein, when a user input by the first object is detected, the processor is configured to:
switch the guide interface to an execution screen of the demo content; and
process signal transmission/reception corresponding to the user input through a link with the external device during the execution of the demo content.

7. The electronic device of claim 4, wherein the processor is configured to:
control the display to display a guide interface of a previous content or a next content of the content through a link with the external device when a user input by the second object is detected;
download the content through the link with the external device when a user input by the third object is detected; and
register the content in a wish list through the link with the external device when a user input by the fourth object is detected.

8. An electronic device comprising:
a wireless communication module;
a memory; and
a processor configured to:
provide, via the wireless communication module, a content list including at least one recommended content to an external device, wherein the at least one recommended content is determined based on history information regarding content used by a user of the external device;
receive, via the wireless communication module, a request for executing a demo content based on the content list;
stream, via the wireless communication module, the demo content to the external device in response to a request for the demo content of the external device;
detect whether to stop the demo content during the streaming of the demo content;
control the wireless communication module to stop the streaming of the demo content when there is a determination to stop the use of the demo content; and
process a content download, content navigation, or content like registration according to a content request when the content request is detected after the streaming of the demo content is stopped.

9. The electronic device of claim 8, wherein, when a request for executing the demo content is received, the processor is configured to:
generate the demo content corresponding to the content based on the content or searches for a pre-configured demo content corresponding to the content; and
provide the generated or found demo content to the external device through a streaming service.

10. The electronic device of claim 9, wherein the streaming service includes a cloud-based service for playing the content in real time without downloading the content in the external device.

11. The electronic device of claim 8, wherein the processor is configured to determine to stop the use of the demo content according to detection of expiration of a predetermined range of the demo content or reception of a request for ending the demo content of the external device during the streaming of the demo content.

12. A method of operating an electronic device, the method comprising:
receiving a content list including at least one recommended content from an external device, wherein the at least one recommended content is determined based on history information regarding content used by a user of the electronic device;
displaying the content list;

upon detecting an input for selecting a content from the content list, displaying a guide interface for a content;

detecting a user input based on the guide interface;

determining a download or an execution of the content based on the user input through the guide interface;

receiving a demo content from an external device and displaying the demo content in response to the execution of the content; and downloading the content from the external device in response to the download of the content.

13. The method of claim 12, wherein the demo content includes a content streamed by the external device to allow pre-experience of the content before the content is downloaded.

14. The method of claim 12, wherein the guide interface includes detailed content information corresponding to the content and control objects related to content use controls, and the control objects include a first object for performing user experience of the content, a second object for navigation between different contents within a content list, a third object for the download of the content, a fourth object for like selection of the content, and a fifth object for toggling the control objects.

15. The method of claim 14, wherein the displaying of the demo content comprises:

when a user input by the first object is detected, making a request for a demo content corresponding to the content to the external device and executing the content by receiving the demo content streamed from the external device;

when a user input by the second object is detected, displaying a guide interface of a previous content or a next content of the content through a link with the external device;

when a user input by the third object is detected, downloading the content through the link with the external device; and when a user input by the fourth object is detected, registering the content in a wish list through the link with the external device.

16. A method of operating an electronic device, the method comprising:

providing a content list including at least one recommended content to an external device, wherein the at least one recommended content is determined based on history information regarding content used by a user of the external device;

receiving a request for executing a demo content based on the content list;

streaming the demo content to the external device in response to a request for the demo content of the external device;

detecting whether to stop the use of the demo content during the streaming of the demo content;

when there is a determination to stop the use of the demo content, stopping the streaming of the demo content; and when a content request is detected after the streaming of the demo content is stopped, processing a content download, content navigation, or content like registration according to the content request.

17. The method of claim 16, further comprising:

when a request for executing the demo content is received, generating the demo content corresponding to the content based on the content or searching for a pre-configured demo content corresponding to the content; and providing the generated or found demo content to the external device through a streaming service, wherein the streaming service includes a cloud-based service for playing the content in real time without downloading the content in the external device.

18. The method of claim 16, wherein the detecting of the stopping of the use of the demo content comprises determining to stop the use of the demo content according to detection of expiration of a predetermined range of the demo content or reception of a request for ending the demo content of the external device during the streaming of the demo content.

* * * * *